US012514779B2

(12) United States Patent
Li

(10) Patent No.: US 12,514,779 B2
(45) Date of Patent: Jan. 6, 2026

(54) SEXUAL MASSAGE APPARATUS, ENGINE ASSEMBLY, AND MASSAGE MACHINE

(71) Applicant: Siran Li, Shenzhen (CN)

(72) Inventor: Siran Li, Shenzhen (CN)

( * ) Notice: Subject to any disclaimer, the term of this patent is extended or adjusted under 35 U.S.C. 154(b) by 1048 days.

(21) Appl. No.: 17/561,753

(22) Filed: Dec. 24, 2021

(65) Prior Publication Data

US 2023/0114593 A1 Apr. 13, 2023

Related U.S. Application Data

(63) Continuation of application No. PCT/CN2021/122822, filed on Oct. 9, 2021.

(51) Int. Cl.
*A61H 19/00* (2006.01)

(52) U.S. Cl.
CPC ..... *A61H 19/30* (2013.01); *A61H 2201/1215* (2013.01); *A61H 2201/1472* (2013.01); *A61H 2205/087* (2013.01)

(58) Field of Classification Search
None
See application file for complete search history.

(56) References Cited

U.S. PATENT DOCUMENTS

2016/0015595 A1 1/2016 Blenk et al.
2020/0046599 A1 2/2020 Sedic
2020/0178943 A1* 6/2020 Nakamura .............. A61F 5/451
2021/0128395 A1* 5/2021 Witt ..................... A61H 9/0057

FOREIGN PATENT DOCUMENTS

CN 106166109 A 11/2016
CN 106726416 A 5/2017
CN 109223496 A 1/2019
CN 210931531 U 7/2020
CN 210932643 U 7/2020
JP 2003290307 A 10/2003
JP 2020081721 A 6/2020
(Continued)

OTHER PUBLICATIONS

Japanese Notice of Reasons for Refusal, Japanese Patent Application No. 2023-559033, mailed Aug. 27, 2024 (8 pages).
(Continued)

*Primary Examiner* — Thaddeus B Cox

(57) ABSTRACT

Disclosed are a sexual massage apparatus, an engine assembly, and a massage machine. The sexual massage apparatus includes: an engine assembly, including an outer shell and a first driving unit, wherein the outer shell has a hollow cavity defined therein, and the first driving unit is arranged in the hollow cavity; a massage machine, capable of being at least partly inserted into the hollow cavity of the engine assembly and being separated from the engine assembly, wherein the massage machine includes a first sexual stimulation unit, when the massage machine is at least partly inserted into the hollow cavity, the first sexual stimulation unit is controlled by the first driving unit, to apply a first sexual stimulation for a human body part, and the first sexual stimulation is a compression sexual stimulation generated along a radial direction for the human body part.

26 Claims, 12 Drawing Sheets

(56) References Cited

FOREIGN PATENT DOCUMENTS

| | | | |
|---|---|---|---|
| JP | 2020521587 | A | 7/2020 |
| WO | 2018025413 | A1 | 2/2018 |

OTHER PUBLICATIONS

International Search Report and Written Opinion, application No. PCT/CN2021/122822, mailed on Jul. 18, 2022.
European partial Search Report, European Application No. 21824265.9, mailed Feb. 13, 2025 (36 pages).
Japanese Decision to Grant a Patent, Japanese Application No. 2023-559033, mailed Feb. 25, 2025 (5 pages).
European Search Report, European Application No. 21824265.9, mailed May 7, 2025 (18 pages).

* cited by examiner

SEXUAL MASSAGE APPARATUS, ENGINE ASSEMBLY, AND MASSAGE MACHINE

CROSS REFERENCE

The present application is a continuation-application of International (PCT) Patent Application No. PCT/CN2021/122822, filed on Oct. 9, 2021, the entire contents of which are hereby incorporated by reference in its entirety.

TECHNICAL FIELD

The present disclosure relates to the field of sexual massage technologies, and in particular to a sexual massage apparatus, an engine assembly, and a massage machine.

BACKGROUND

With the development of society and the accelerated pace of life, the mental pressure of modern people is getting bigger and bigger. How to relieve stress has become an increasingly important issue, and more and more various sexual dysfunctions have become an important factor affecting people's quality of life. Medicine has proved that the massage stimulation of genitals can effectively promote the secretion of sex hormones, increase eroticism and effectively treat many diseases of the male or female genitals. Therefore, sexual massage apparatuses are increasingly popular. However, there are many drawbacks of sexual massage apparatuses currently in the market. Firstly, conventional sexual massage apparatuses have limited functions and are only capable of simple stimulation, such that users' emotions are difficult to be mobilized and the users have less willingness to use. Secondly, the integration designs of the conventional sexual massage apparatuses are easily damaged and with high usage cost, increasing the burden of the users.

SUMMARY OF THE DISCLOSURE

To solve the above technical problems, the present disclosure provides a sexual massage apparatus, an engine assembly, and a massage machine.

In a first aspect, the present disclosure provides a sexual massage apparatus, including: an engine assembly, comprising an outer shell and a first driving unit, wherein the outer shell defines a hollow cavity therein, and the first driving unit is arranged in the hollow cavity and configured to supply a first driving force; and a massage machine, capable of being at least partly inserted into the hollow cavity of the engine assembly and capable of being separated from the engine assembly, wherein the massage machine comprises a first sexual stimulation unit; when the massage machine is at least partly inserted into the hollow cavity of the engine assembly, the first sexual stimulation unit is controlled by the first driving unit, to perform a first operation under the first driving force and apply a first sexual stimulation for a human body part, and the first sexual stimulation is a compression sexual stimulation generated along a radial direction for the human body part.

In a second aspect, the present disclosure further provides an engine assembly of a sexual massage apparatus.

In a third aspect, the present disclosure further provides a massage machine of a sexual massage apparatus.

In some embodiments, the engine assembly further includes a second driving unit, and the massage machine further includes a second sexual stimulation unit; the second driving unit is arranged in the hollow cavity of the engine assembly and configured to supply a second driving force; when the massage machine is at least partly inserted into the hollow cavity of the engine assembly, the second sexual stimulation unit is controlled by the second driving unit, to perform a second operation under the second driving force and apply a second sexual stimulation for the human body part, and the second sexual stimulation is a rotation sexual stimulation generated along a circumferential direction for the human body part.

In some embodiments, the engine assembly further includes a third driving unit, arranged in the hollow cavity of the engine assembly and configured to supply a third driving force; when the massage machine is at least partly inserted into the hollow cavity of the engine assembly, the first sexual stimulation unit and the second sexual stimulation unit are driven by the third driving force, to perform a third sexual stimulation and apply a third sexual stimulation for the human body part, and the third sexual stimulation is a relative-displacement sexual stimulation generated along an axial direction for the human body part.

In the present disclosure, the sexual massage apparatus can apply three different dimensions of stimulation to a human body part in radial, circumferential or axial directions. In particular, the sexual massage apparatus can produce compression sexual stimulation in the radial direction for the human body part, which can greatly stimulate the human body part and enhance the stimulation effect, and can bring the user great pleasure. Moreover, the engine assembly and the massage machine of the sexual massage apparatus of the present disclosure are separate parts, and both can be packaged into independent products. The engine assembly is designed to provide driving forces to achieve the above stimulation, so the engine assembly can be designed as a universal driving-force device to match the massage machine with different types or different sizes, thereby greatly reducing usage cost to meet the needs of different users. The massage machine which may be easily damaged can be replaced independently, greatly reducing replacement cost.

BRIEF DESCRIPTION OF THE DRAWINGS

Embodiments of the present disclosure have other advantages and features that will be more readily apparent from the specific embodiments and appended claims below when combined with the accompanying drawings.

Figure 1:
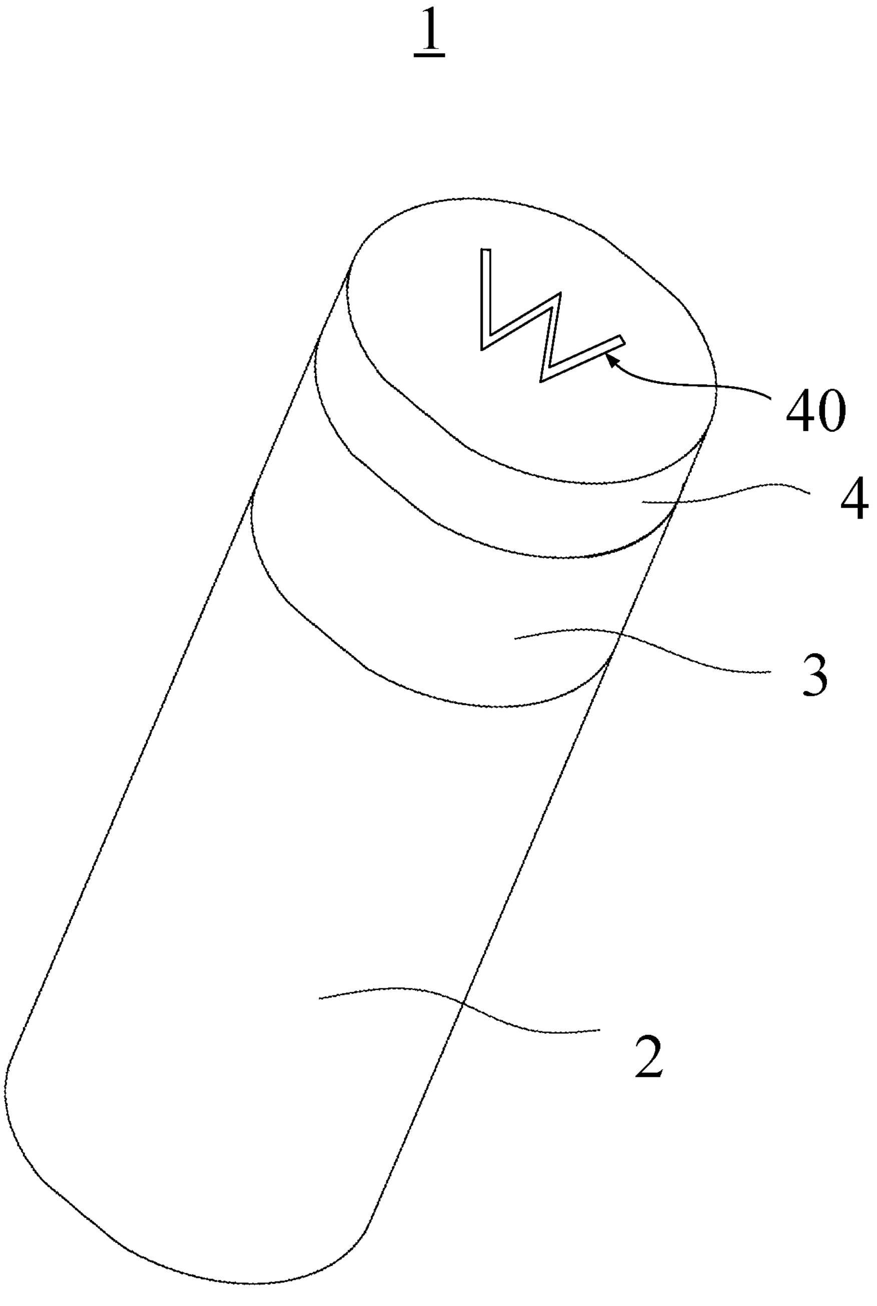
FIG. 1 is a perspective schematic view of a sexual massage apparatus according to an embodiment of the present disclosure.

The accompanying drawings depict various embodiments for illustrative purposes only. Those skilled in the art will readily recognize from the following discussion that alternative embodiments of the structures and methods illustrated herein may be employed without departing from the principles described herein.

DETAILED DESCRIPTION

Embodiments of the present disclosure are described in detail below, and examples of the embodiments are shown in the accompanying drawings, wherein same or similar designations indicate same or similar components or components having same or similar functions. The embodiments described below by reference to the accompanying drawings are exemplary, intended to explain the present disclosure and are not to be construed as limiting the present disclosure.

In the description of the present disclosure, it is to be understood that the terms "center", "longitudinal", "transverse", "length", "width", "thickness", "front", "back", "left", "right", "vertical", "horizontal", "top", "bottom", "inside", "outside", "clockwise", "counterclockwise" and the like indicate orientation or positional relationships based on the orientation or positional relationships shown in the accompanying drawings and are intended only to facilitate and simplify the description of the present disclosure, not to indicate or imply that the device or element referred to must have a particular orientation, be constructed and operate in a particular orientation, and therefore is not to be construed as a limitation of the present disclosure.

In addition, the terms "first" and "second" are for descriptive purposes only and are not to be construed as indicating or implying relative importance or implicitly specifying the number of technical features indicated. Thus, the features qualified with "first" and "second" may explicitly or implicitly include one or more such features. In the description of the present disclosure, "plurality" means two or more, unless otherwise expressly and specifically limited.

In the present disclosure, unless otherwise expressly specified and limited, the terms "mounted," "attached," "connected," "fixed," etc. shall be understood in a broad sense. For example, it may be a fixed connection, a detachable connection, or a one-piece connection; a mechanical connection or an electrical connection; a direct connection or an indirect connection through an intermediate medium, or a connection within two components. To those skilled in the art, the specific meaning of the above terms in the present disclosure can be understood on a case-by-case basis.

In the present disclosure, unless otherwise expressly specified and limited, a first feature "on" or "under" a second feature may include direct contact between the first and second features, or may include contact between the first and second features not directly but through a separate feature between them. Also, the first feature being "on", "above" or "on top of" the second feature includes the first feature being directly above and diagonally above the second feature, or simply indicating that the first feature is horizontally higher than the second feature. The first feature being "below", "under" and "on bottom of" the second feature includes the first feature being directly below and diagonally below the second feature, or simply indicating that the first feature is horizontally lower than the second feature.

The present disclosure is described in further detail below by way of specific embodiments in conjunction with the accompanying drawings.

Figure 2:
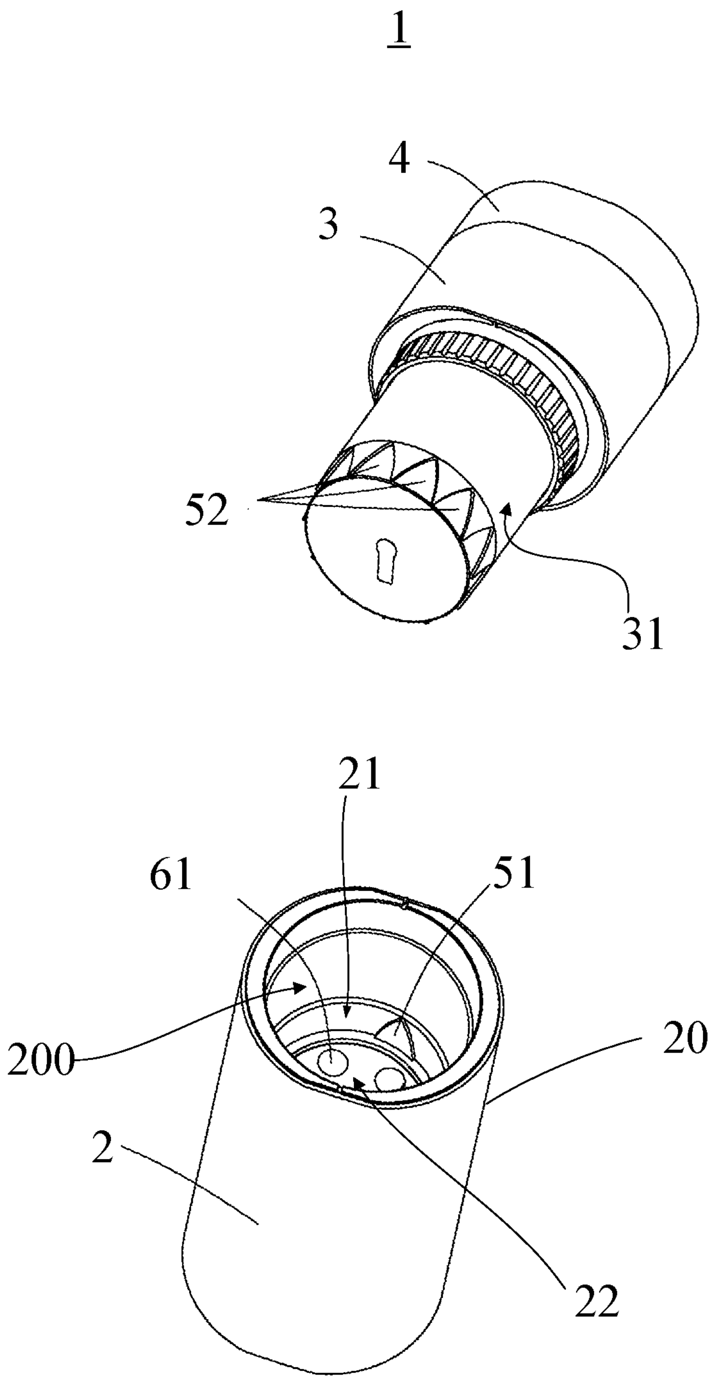
FIG. 2 a structural schematic view of the sexual massage apparatus shown in FIG. 1 in a disassembled state of an engine assembly and a massage machine.

Referring to FIGS. 1-2, an embodiment of the present disclosure provides a sexual massage apparatus 1.

The sexual massage apparatus 1 includes an engine assembly 2, a massage machine 3 and a cover 4.

The engine assembly 2 may include an outer shell 20 defining a hollow cavity 200. In some embodiments, the outer shell 20 has a columnar outer profile, such as a cylindrical outer profile, a polygonal columnar outer profile, etc. The hollow cavity 200 may be a cavity defined by the outer shell 20 having an opening at least at one end to accommodate the massage machine 3 through the opening.

The massage machine 3 has a capability of being at least partly inserted into the hollow cavity 200 of the engine assembly 2 and being separated from the engine assembly 2, thereby performing a massage stimulation operation under the drive of the engine assembly 2. The massage machine 3 can also be pulled out from the hollow cavity 200 of the engine assembly 2 for cleaning, maintaining, replacement, etc. In the present disclosure, the engine assembly 2 is designed to match the massage machine 3 with different types, for example, a massage machine suitable for massage stimulation of the penis or a massage machine suitable for massage stimulation of the vagina. Alternatively, the engine assembly 2 is designed to match the massage machine 3 of the same type but of different sizes, for example, massage machines suitable for massage stimulation of the penis in a small size range, massage machines suitable for massage stimulation of the penis in a medium size range, or massage machines suitable for massage stimulation of the penis in a large size range. In one embodiment, the sexual massage apparatus 1 of the present disclosure is introduced with the massage machine 3 suitable for massage stimulation of the penis as an example.

The cover 4 may be configured to cover an exposed part of the massage machine 3 to protect the massage machine 3 from external environmental contamination. The cover 4 can be detachably covered on the massage machine 3 by, for example, threaded connection or snap connection.

Figure 10:
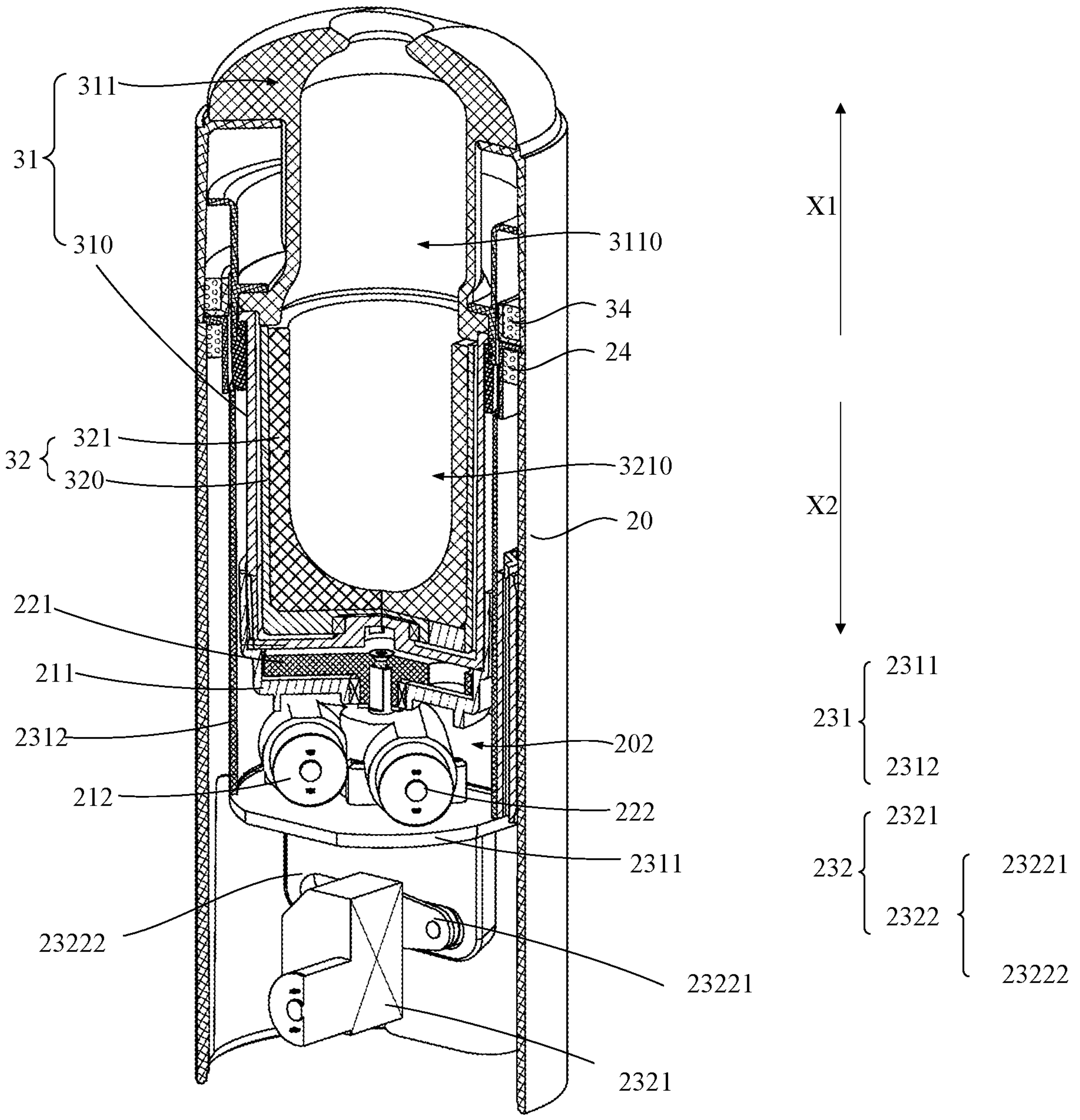
FIG. 10 is a perspective schematic view of a sexual massage apparatus in an assembled state of an engine assembly and a massage machine according to an embodiment of the present disclosure.
Figure 12:
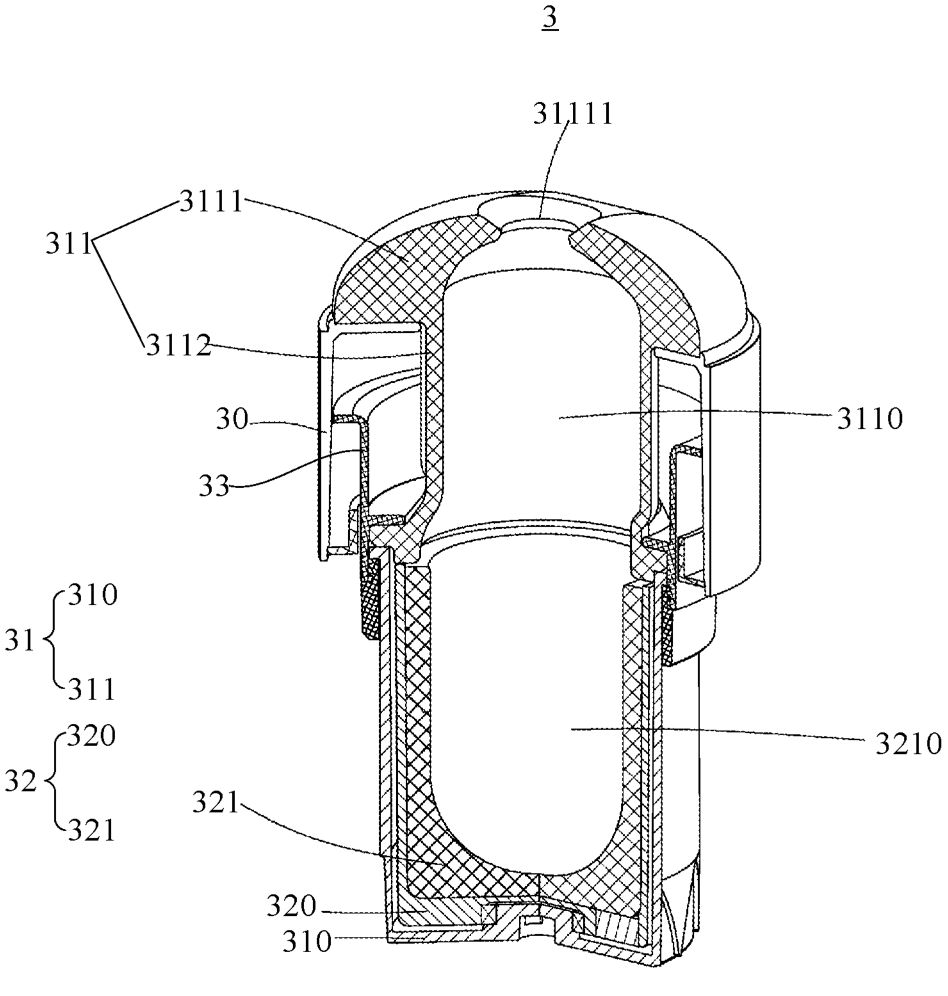
FIG. 12 is a partial sectional view of a massage machine according to an embodiment of the present disclosure.

In the embodiments, the engine assembly 2 may include a first driving unit 21 arranged in the hollow cavity 200 and configured to supply a first driving force. Correspondingly, the massage machine 3 includes a first sexual stimulation unit 31 (for example, the first sexual stimulation unit 31 for massage stimulation of the penis as shown in FIGS. 10 and 12). When the massage machine 3 is at least partly inserted into the hollow cavity 200, the first sexual stimulation unit 31 is controlled by the first driving unit 21 to perform a first operation under the first driving force provided by the first driving unit 21 and apply a first sexual stimulation for a human body part. The first sexual stimulation is a compression sexual stimulation generated along a radial direction for the human body part.

The engine assembly 2 may further include a second driving unit 22 arranged in the hollow cavity 200 and configured to supply a second driving force. Correspondingly, the massage machine 3 further includes a second sexual stimulation unit (not shown in FIG. 2; e.g., the second sexual stimulation unit 32 for massage stimulation of the penis as shown in FIGS. 10 and 12). When the massage machine 3 is at least partly inserted into the hollow cavity 200, the second sexual stimulation unit is controlled by the second driving unit 22 to perform a second operation under the second driving force provided by the second driving unit 22 and apply a second sexual stimulation for the human body part. The second sexual stimulation is a rotation sexual stimulation generated along a circumferential direction for the human body part.

The engine assembly 2 of the sexual massage apparatus 1 of the present disclosure will be described hereinafter specifically as an example in FIGS. 3-11. FIGS. 3-11 are structural schematic views of the engine assembly 2 according to an embodiment of the present disclosure.

Figure 3:
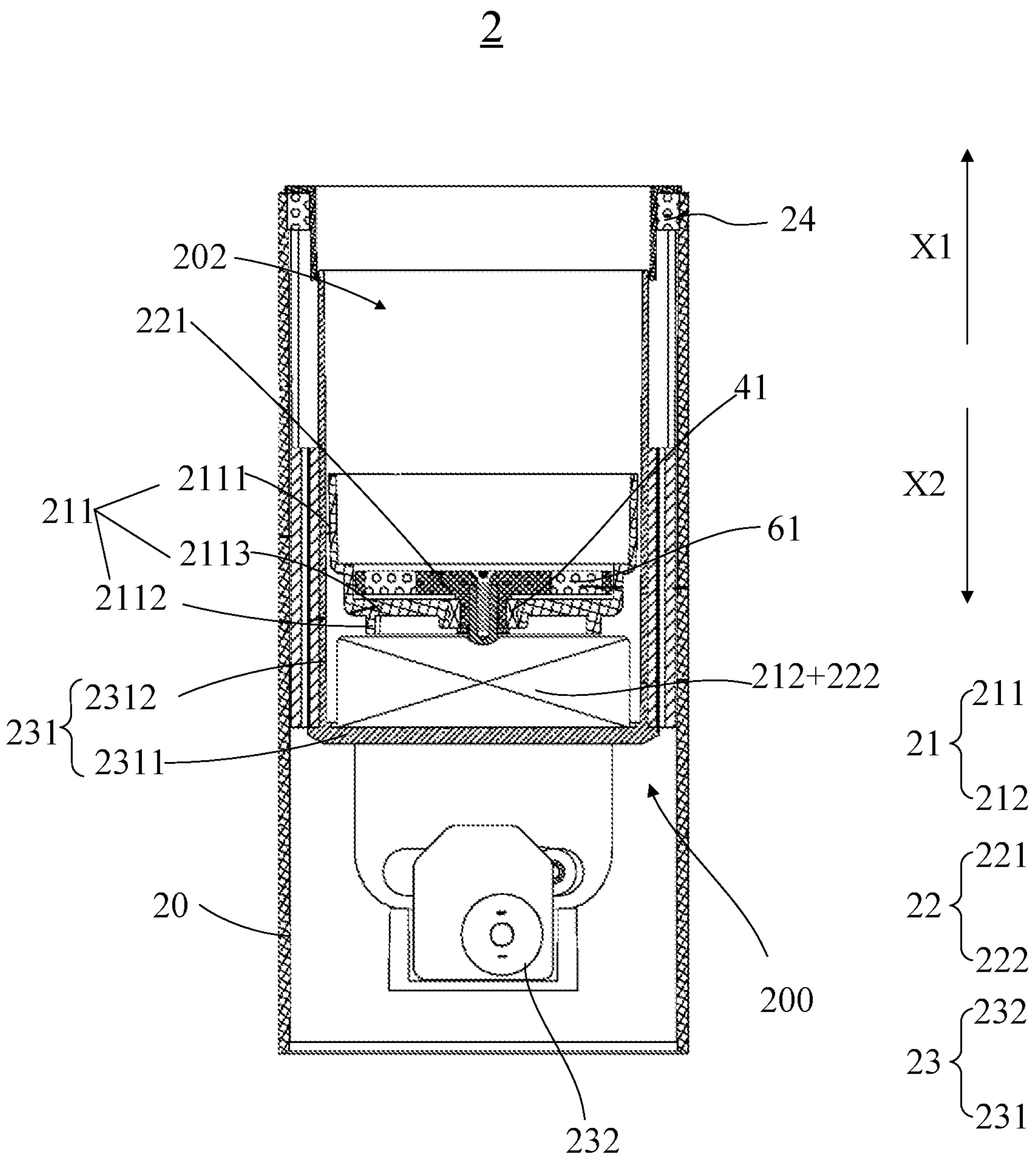
FIG. 3 is a partial sectional view of an engine assembly according to an embodiment of the present disclosure.

As shown in FIG. 3, the first driving unit 21 includes a first rotation component 211 and a first driving-force mechanism 212. The first rotation component 211 is coupled with the first driving-force mechanism 212 to perform a first rotating motion under the driving of the first driving-force mechanism 212 for outputting the first driving force. The first rotation component 211 may, for example, rotate about a central longitudinal axis of the engine assembly 2.

Figure 4:
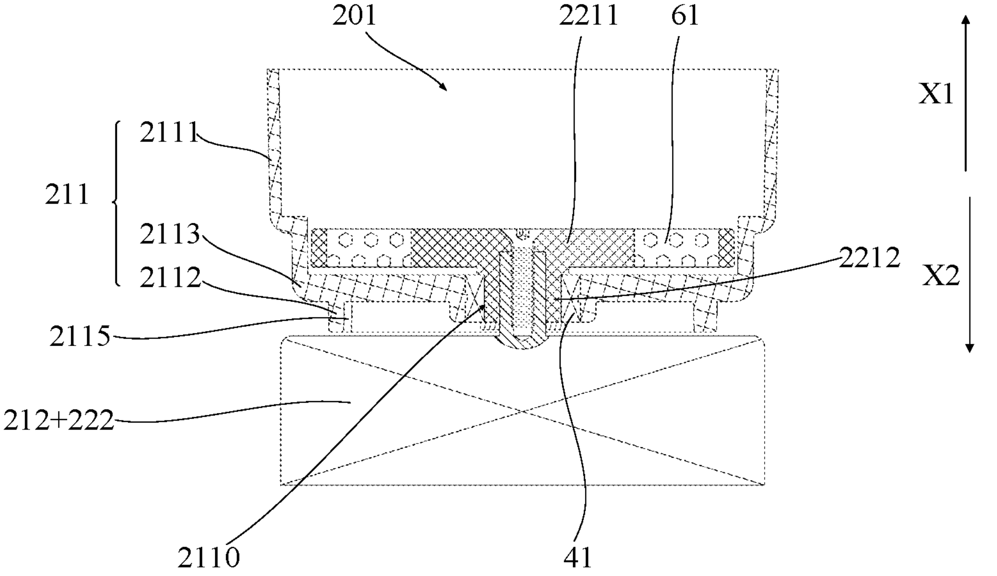
FIG. 4 is a partial enlarged view of a partial structure of the engine assembly shown in FIG. 3.

As shown in FIG. 4, in the embodiment, the first rotation component 211 may be a driving base, which may preferentially be a one-piece structure. The driving base (the first rotation component) 211 may include a driving bottom plate 2113, a first driving side wall 2111 extending from the driving bottom plate 2113 along a first direction X1, and a second driving side wall 2112 extending from the driving bottom plate 2113 along a second direction X2. It can be seen that the first direction X1 and the second direction X2 are respectively perpendicular to the driving bottom plate 2113, and the first direction X1 is opposite to the second direction X2. The first direction X1 and the second direction X2 are parallel to the central longitudinal axis of the engine assembly 2, respectively. The driving bottom plate 2113 may be a circular flat plate. The first driving side wall 2111 and the second driving side wall 2112 may be annular side walls formed by extending from edges of the circular driving bottom plate 2113 toward the first direction X1 and the second direction X2, respectively.

Figure 5:
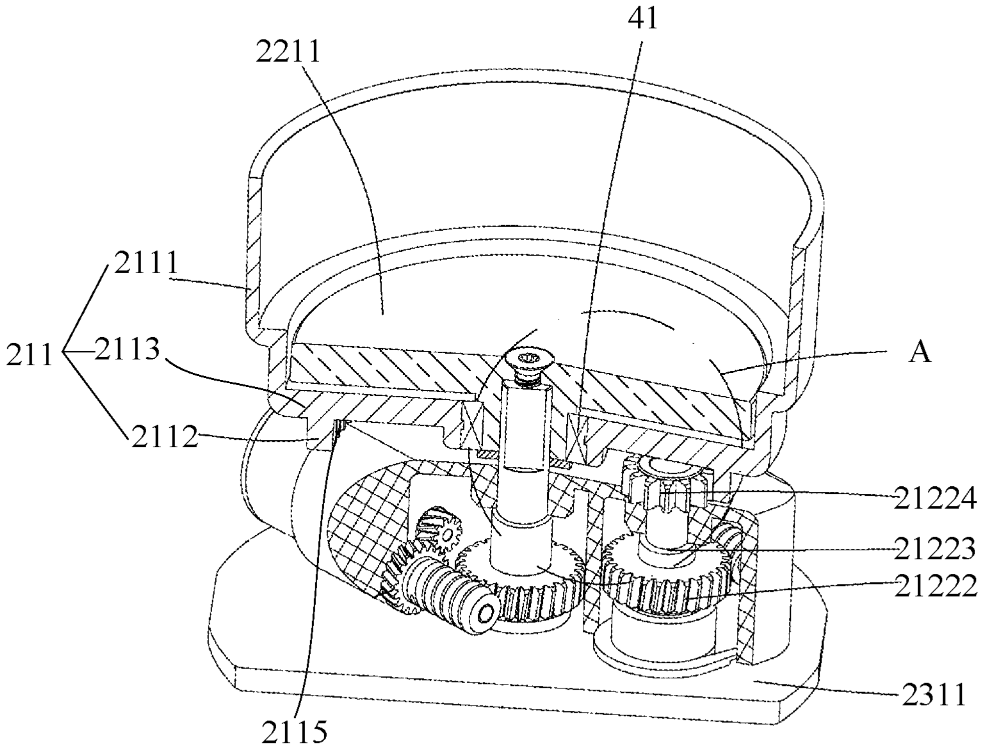
FIG. 5 is a partial sectional view of the partial structure of the engine assembly shown in FIG. 4.

The second driving side wall 2112 may have an annular rack 2115 arranged thereon. As shown in FIGS. 4-5, an inner side wall of the second driving side wall 2112 is arranged with the annular rack 2115. The annular rack 2115 is configured to be meshed with the first driving-force mechanism 212, such that a mesh connection is formed between the first rotation component 211 and the first driving-force mechanism 212 and the first rotation component 211 is driven to rotate by the first driving-force mechanism 212.

Figure 6:
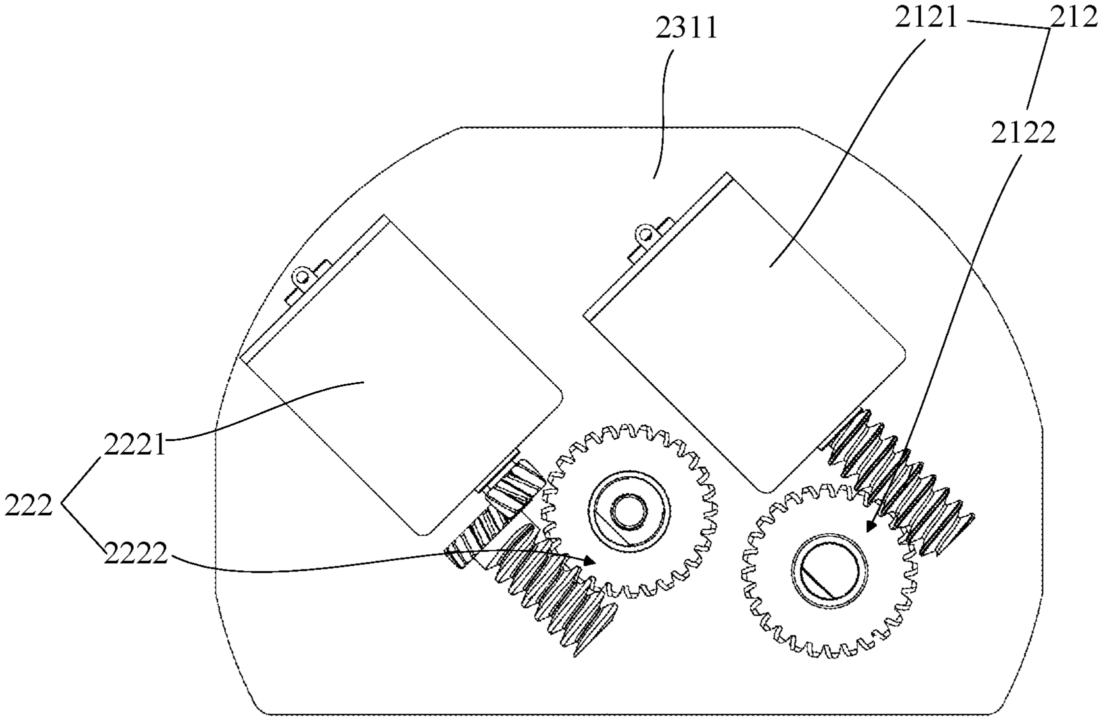
FIG. 6 is a top view of a first driving-force mechanism and a second driving-force mechanism shown in FIG. 5.
Figure 7:
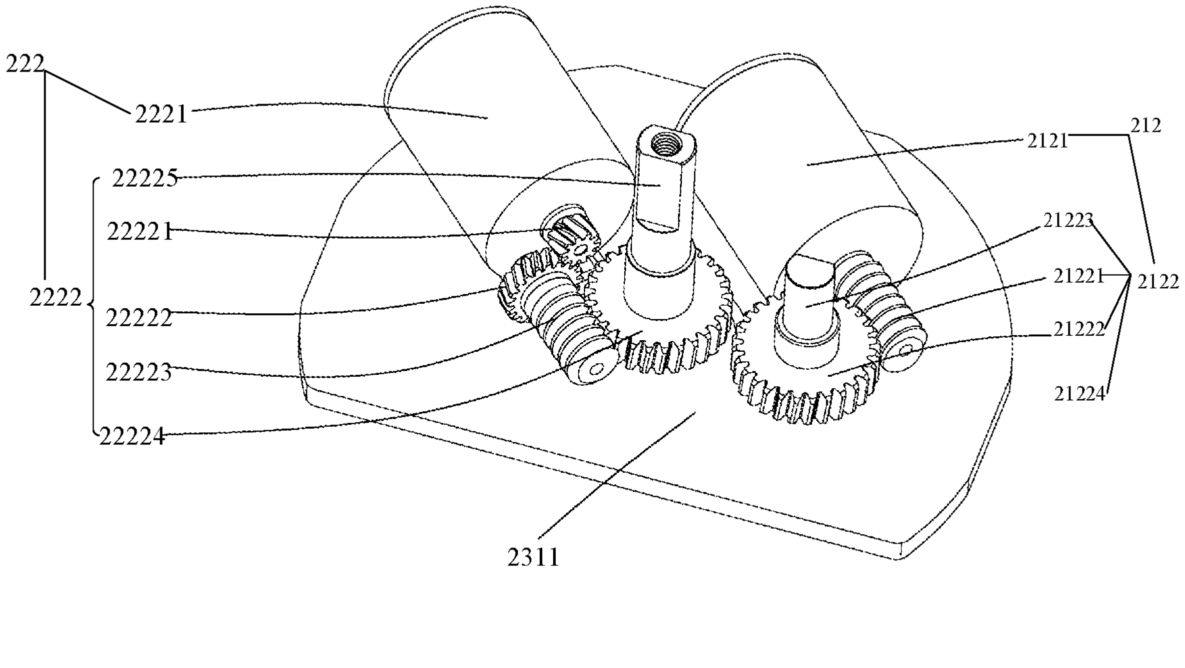
FIG. 7 is a perspective schematic view of a first driving-force mechanism and a second driving-force mechanism shown in FIG. 5.

As shown in FIGS. 5-7, the first driving-force mechanism 212 may include a first motor 2121 and a first worm-and-gear assembly 2122 connected by transmission. The first motor 2121 is configured to provide a driving force and may be an electric motor, in particular an electric stepper motor.

The first worm-and-gear assembly 2122 may include a first worm 21221, a first worm gear 21222, a first supporting shaft 21223, and a first gear 21224. The first motor 2121 of the first driving-force mechanism 212 is coupled to the first worm 21221 to output a driving force through the first worm 21221. The first worm 21221 is engaged with the first worm gear 21222 for driving the first worm gear 21222 to rotate by following the first worm 21221. One end of the first supporting shaft 21223 is fixed to the first worm gear 21222 and the other opposite end of the first supporting shaft 21223 is fixed to the first gear 21224 such that the first supporting shaft 21223 and the first gear 21224 are driven to rotate by following the rotation of the first worm gear 21222.

As shown in FIG. 5, the first gear 21224 is engaged with the annular rack 2115 of the second driving side wall 2112. Therefore, as shown in FIGS. 5-7, the first driving-force mechanism 212 outputs a driving force through the first motor 2121 and transmits the driving force through the first worm-and-gear assembly 2122 to drive the first rotation component (driving base) 211 to rotate.

Moreover, the first motor 2121 may be a bidirectional driving-force output device. In the present disclosure, the output driving force of the first motor 2121 can be changed to adjust the rotation direction and rotation speed of the first worm 21221. The rotation direction and rotation speed of the first gear 21224 may be adjusted through the driving-force transmission of the first worm gear 21222 and the first supporting shaft 21223. By engaging the first gear 21224 with the annular rack 2115 on the second driving side wall 2112, the first rotation component (driving base) 211 including the second driving side wall 2112 can be driven to rotate, and the rotation direction and rotation speed of the first rotation component (driving base) 211 can be adjusted.

Of course, it can be understood by those skilled in the art that the first motor 2121 may also be a unidirectional driving-force output device that can drive the first worm 21221 to rotate only in a unidirectional rotation direction and can adjust the rotation speed of the first worm 21221, thereby driving the first rotation component (driving base) 211 to rotate in the unidirectional rotation direction by the first worm-and-gear assembly 2122 and adjusting the rotation speed of the first rotation component (driving base) 211 to provide the first driving force.

Figure 9:
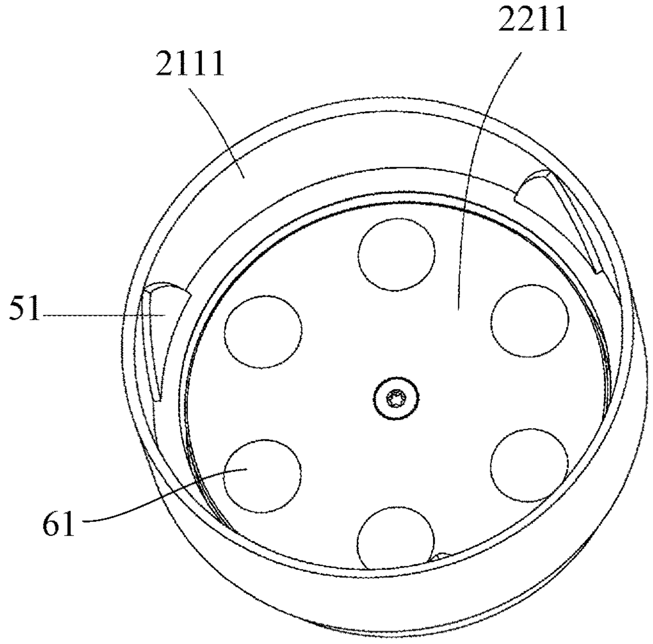
FIG. 9 is a perspective schematic view of a first rotation component and a second rotation component shown in FIG. 5.

Referring to FIGS. 4-5, the first driving side wall 2111 may be cooperated with the driving bottom plate 2113 to define a first containing cavity 201 to accommodate other components. Moreover, as shown in FIG. 9, the first driving side wall 2111 of the first rotation component (driving base) 211 is provided with at least one first coupling mechanism 51. Further referring to FIG. 2, the at least one first coupling mechanism 51 may be configured to couple with at least one second coupling mechanism 52 arranged on the first sexual stimulation unit 31 of the massage machine 3. Therefore, when the massage machine 3 is at least partly inserted into the hollow cavity 200 of the engine assembly 2, the at least one first coupling mechanism 51 on the first rotation component (driving base) 211 may be connected to and match the at least one second coupling mechanism 52 on the first sexual stimulation unit 31 of the massage machine 3, such that the first sexual stimulation unit 31 can be controlled by the first rotation component (driving base) 211 of the first driving unit 21. As described above, when the first rotation component (driving base) 211 rotates to provide the first driving force, the first sexual stimulation unit 31 follows the rotation of the first rotation component 211 and performs the first rotating motion through the first coupling mechanism 51 being connected to and matching the second coupling mechanism 52, thereby producing the compression sexual stimulation generated along the radial direction for the human body part. In addition, it is understood by those skilled in the art that the rotation axis of the first driving force provided by the first rotation component 211 of the first driving unit 21 is co-axial with the rotation axis of the first rotating motion performed by the first sexual stimulation unit 31, both of the rotation axes are located on the central longitudinal axis of the engine assembly 2.

The first coupling mechanism 51 may be a first clamping component, and the second coupling mechanism 52 may be a second clamping component cooperating with the first clamping component. As shown in FIGS. 2 and 9, in the embodiments, the first coupling mechanism 51 may be a triangular protrusion arranged on an inner wall of the first driving side wall 2111, and the second coupling mechanism 52 may be a triangular recess defined in the first sexual stimulation unit 31. The triangular protrusion can be snapped into the triangular recess when the massage machine 3 is inserted in the hollow cavity 200 of the engine assembly 2, thus realizing the connection fit of the first rotation component 211 of the first driving unit 21 and the first sexual stimulation unit 31 to drive the first rotating motion of the first sexual stimulation unit 31.

Further, referring to FIGS. 3-11, as shown in FIG. 3, the engine assembly 2 may further include a second driving unit 22. The second driving unit 22 includes a second rotation component 221 and a second driving-force mechanism 222 arranged in the hollow cavity 200 of the engine assembly 2. A part of the second rotation component 221 is coupled with the first rotation component 211 via a first bearing 41 to make the second rotation component 221 able to freely rotate relative to the first rotation component 211. The part of the second rotation component 221 passes through the first bearing 41 and is coupled with the second driving-force mechanism 222 to perform a second rotating motion under the driving of the second driving-force mechanism 222 for outputting the second driving force. In some embodiments, the rotation axis of the first rotating motion of the first rotation component 211 is co-axial with the rotation axis of the second rotating motion of the second rotation component 221.

Specifically, as shown in FIG. 4, the second rotation component 221 may include a turntable 2211 and a supporting portion 2212 extending from the turntable 2211 along the second direction X2. In some embodiments, the second rotation component 221 is a one-piece structure and arranged in the first containing cavity 201. The turntable 2211 may be a rounded flat plate that fits the first driving side wall 2111 of the first rotation component 211, and the supporting portion 2212 may be a protrusion extending from a central region of the turntable 2211 toward the second direction X2. The driving bottom plate 2113 of the first rotation component 211 has a through hole 2110 formed in the center thereof. The supporting portion 2212 of the second rotation component 221 is arranged in the through hole 2110 via the first bearing 41 and fixedly coupled to the second driving-force mechanism 222 through the through hole 2110. By virtue of the first bearing 41, the second rotation component 221 is able to freely rotate relative to the first rotation component 211 under the driving of the second driving-force mechanism 222. In the embodiments, the supporting portion 2212 may be a columnar structure and inserted in an inner ring of the first bearing 41. The first bearing 41 is arranged in the through hole 2110 of the driving bottom plate 2113, and an outer ring of the first bearing 41 is affixed to the driving bottom plate 2113 at the through hole 2110, such that the second rotation component 221 and the first rotation component 211 can rotate independently without interfering with each other by the provision of the first bearing 41. Furthermore, in some embodiments, the height of the supporting portion 2212 may be configured such that the turntable 2211 is spaced apart from the driving bottom plate 2113 by a certain distance, thereby causing the first rotation component 211 and the second rotation component 221 to rotate independently without interfering with each other. In addition, the supporting portion 2212 and the first bearing 41 may be treated with an interference fit, and the first bearing 41 and the through hole 2110 of the driving bottom plate 2113 may also be treated with an interference fit to improve the sealing of the engine assembly 2.

As shown in FIGS. 5-8, the second driving-force mechanism 222 may include a second motor 2221 and a second worm-and-gear assembly 2222. The second motor 2221 is similar to the first motor 2121, and is configured to provide a driving force and may be an electric motor, in particular an electric stepper motor.

The second worm-and-gear assembly 2222 may include an output gear 22221, a second gear 22222, a second worm 22223, a second worm gear 22224 and a second supporting shaft 22225. The second motor 2221 of the second driving-force mechanism 222 is coupled to the output gear 22221 to output another driving force through the output gear 22221. The output gear 22221 is engaged with the second gear 22222 for driving the second gear 22222 to rotate by following the output gear 22221. The second worm 22223 is fixed to the second gear 22222 and configured to rotate by following the rotation of the second gear 22222. The second worm gear 22224 is engaged with the second worm 22223 for being driven to rotate by following the rotation of the second worm 22223. One end of the second supporting shaft 22225 is fixed to the second worm gear 22224, and the other opposite end of the second supporting shaft 22225 is fixed to the supporting portion 2212 of the second rotation component 221, for driving the second rotation component 221 to rotate by following the rotation of the second worm gear 22224.

The supporting portion 2212 of the second rotation component 221 may be fixed to the second supporting shaft 22225 of the second worm-and-gear assembly 2222 of the second driving-force mechanism 222 by, for example, by screws.

Figure 8:
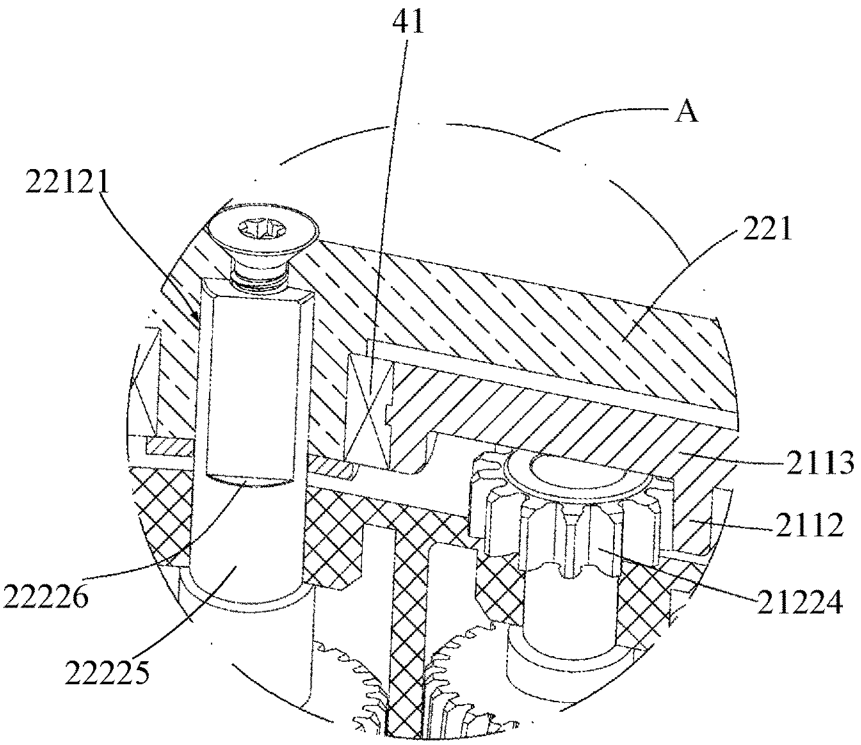
FIG. 8 is an enlarged view of a part A shown in FIG. 5.

Specifically, as shown in FIG. 8, the second supporting shaft 22225 is arranged with an avoidance structure 22226 at an end far from the second worm gear 22224, and a limiting slot 22121 matching the avoidance structure 22226 is defined in the supporting portion 2212 of the second rotation component 221. The avoidance structure 22226 is arranged by an outer side wall of the second supporting shaft 22225 recessed away from the second worm gear 22224. The avoidance structure 22226 of the second supporting shaft 22225 is inserted in the limiting slot 22121 defined in the supporting portion 2212. The avoidance structure 22226 defines a threaded hole, and a screw (not shown) threaded through the turntable 2211 is screwed into the threaded hole in the avoidance structure 22226 to fix the supporting portion 2212 to the second supporting shaft 22225. Of course, those skilled in the art can understand that the supporting portion 2212 can also be fixed with the second supporting shaft 22225 in other ways, which is not limited herein.

As described above, in the present disclosure, the supporting portion 2212 of the second rotation component 221 is fixed to the second supporting shaft 22225 of the second worm-and-gear assembly 2222 of the second driving-force mechanism 222, such that the second driving-force mechanism 222 outputs a driving force through the second motor 2221 and transmits the driving force through the second worm-and-gear assembly 2222 to drive the second rotation component 221 to rotate.

Moreover, the second motor 2221 may be a bidirectional driving-force output device. In the present disclosure, the output driving force of the second motor 2221 can be changed to adjust the rotation direction and rotation speed of the output gear 22221. The rotation direction and rotation speed of the second supporting shaft 22225 fixed to the second worm gear 22224 may be adjusted through the driving-force transmission of the second gear 22222, the second worm 22223, and the second worm gear 22224. By fixedly connecting the second supporting shaft 22225 with the supporting portion 2212 of the second rotation component 221, the second rotation component 221 can be driven to rotate, and the rotation direction and rotation speed of the second rotation component 221 can be adjusted.

Of course, it can be understood by those skilled in the art that the second motor 2221 may also be a unidirectional driving-force output device that can drive the output gear 22221 to rotate only in a unidirectional rotation direction and can adjust the rotation speed of the output gear 22221, thereby driving the second rotation component 221 to rotate in the unidirectional rotation direction by the second worm-and-gear assembly 2222 and adjusting the rotation speed of the second rotation component 221 to provide the second driving force.

Figure 13:
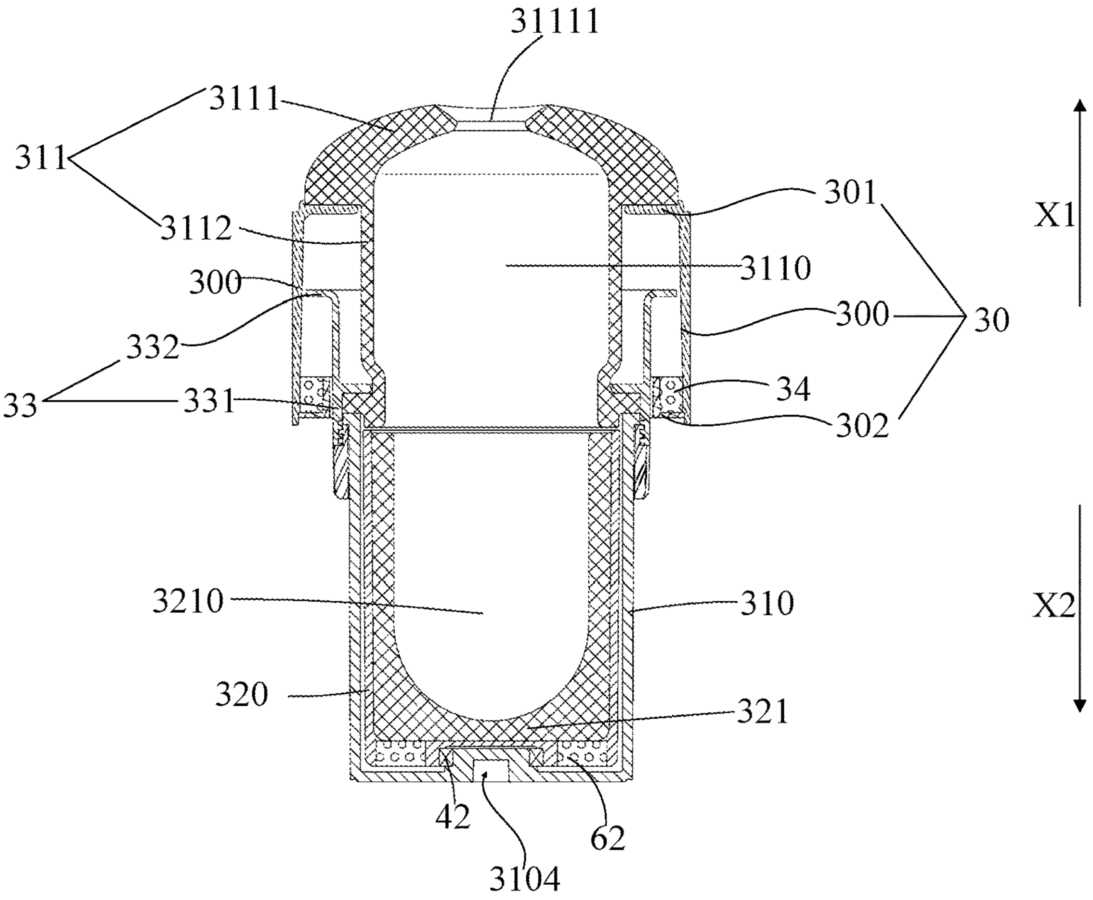
FIG. 13 is a sectional view of the massage machine shown in FIG. 12.
Figure 17:
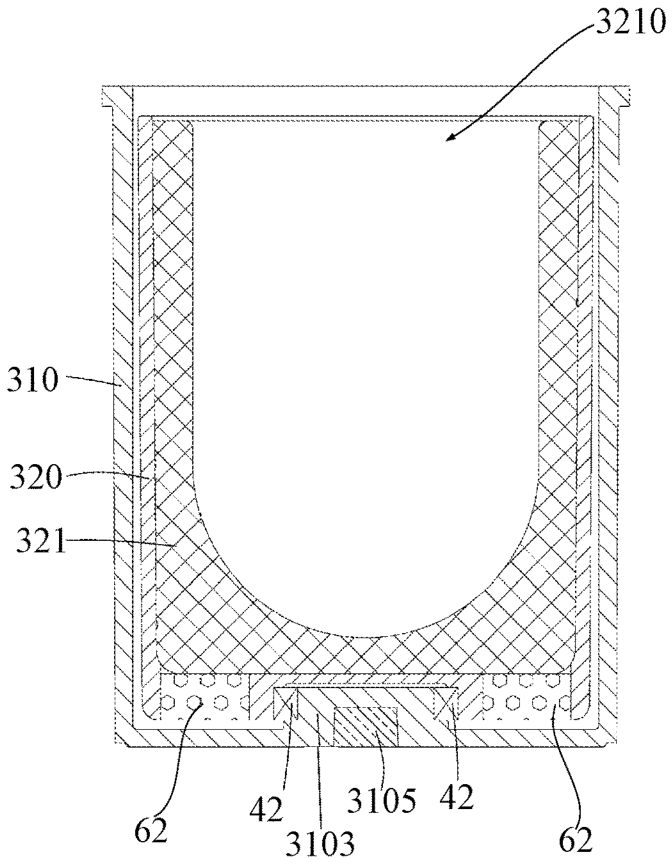
FIG. 17 is sectional view of an outer cup-shaped body, an inner cup-shaped body, and a second massage body shown in FIG. 13.

In addition, as shown in FIGS. 4 and 9, the turntable 2211 of the second rotation component 221 is provided with at least one first driving-force transmission mechanism 61 configured to form a driving-force transmission cooperation with at least one second driving-force transmission mechanism (for example, the second driving-force transmission mechanism 62 as shown in FIG. 13 or FIG. 17) arranged on the second sexual stimulation unit (for example, the second sexual stimulation unit 32 as shown in FIG. 12) of the massage machine 3. Therefore, when the massage machine 3 is at least partly inserted into the hollow cavity 200 of the engine assembly 2, the at least one first driving-force transmission mechanism 61 on the turntable 2211 of the second rotation component 221 can cooperate with the at least one second driving-force transmission mechanism on the second sexual stimulation unit of the massage machine 3, such that the second sexual stimulation unit is controlled by the rotation component 221. When the second rotation component 221 rotates to provide the second driving force, the second sexual stimulation unit follows the rotation of the second rotation component 221 and performs the second rotating motion, thereby producing the rotation sexual stimulation along the circumferential direction for the human body part.

Specifically, the first driving-force transmission mechanism 61 may be a first magnet component, and in particular to a permanent magnet. The second driving-force transmission mechanism may be a second magnet component matching the first magnet component, and in particular to a permanent magnet. As shown in FIG. 9, six first magnet components (first driving-force transmission mechanisms) 61 are arranged in the turntable 2211 in an evenly spaced ring shape. The turntable 2211 defines containing grooves to receive the first magnet components 61. Of course, the number and size of the first magnet components 61 can be set according to needs, which is not limited herein.

In the present disclosure, since the first driving-force transmission mechanism 61 and the corresponding second driving-force transmission mechanism are magnet components, and the second rotation component 221 of the second driving unit 22 and the second sexual stimulation unit in the massage machine 3 can perform driving-force transmission even in a non-contact state, such that the second sexual stimulation unit in the massage machine 3 can be controlled by the second rotation component 221 of the second driving unit 22 to rotate following the rotation of the second rotation component 221. In addition, since the second rotation component 221 and the second sexual stimulation unit can perform driving-force transmission in the non-contact state, the second sexual stimulation unit may be arranged in the first sexual stimulation unit 31, thereby greatly reducing the size of the massage machine 3 and enhancing the sealing of the massage machine 3.

Referring to FIGS. 3-5, as described above, the first rotation component (driving base) 211 of the first driving unit 21 and the second rotation component 221 of the second driving unit 22 may be arranged together. For example, the second rotation component 221 is arranged in the first containing cavity 201 defined by the first rotation component (driving base) 211 to be isolated from the first driving-force mechanism 212 and the second driving-force mechanism 222. Therefore, the first driving-force mechanism 212 and the second driving-force mechanism 222 can be packaged together such that the first rotation component (driving base) 211 can be configured to avoid liquids from reaching the first driving-force mechanism 212 and/or the second driving-force mechanism 222, thus greatly enhancing the sealing of the engine assembly 2. The first driving-force mechanism 212 and the second driving-force mechanism 222 may be arranged side by side, thus greatly reducing the size of the engine assembly 2.

Referring to FIG. 3, as shown in FIG. 3, the engine assembly 2 may further include a third driving unit 23 arranged in the hollow cavity 200 of the engine assembly 2 and configured to supply a third driving force. When the massage machine 3 is at least partly inserted into the hollow cavity 200, the first sexual stimulation unit 31 and the second sexual stimulation unit are driven by the third driving force to perform a third sexual stimulation and apply a third sexual stimulation for the human body part. The third sexual stimulation is a relative-displacement sexual stimulation generated along an axial direction for the human body part. For example, when the massage machine 3 is suitable for massage stimulation of the penis, the first sexual stimulation unit 31 and the second sexual stimulation unit (for example, the second sexual stimulation unit 32 as shown in FIGS. 10 and 12) are driven by the third driving force to move reciprocally in the axial direction relative to the human body part to produce the relative-displacement sexual stimulation.

Figure 11:
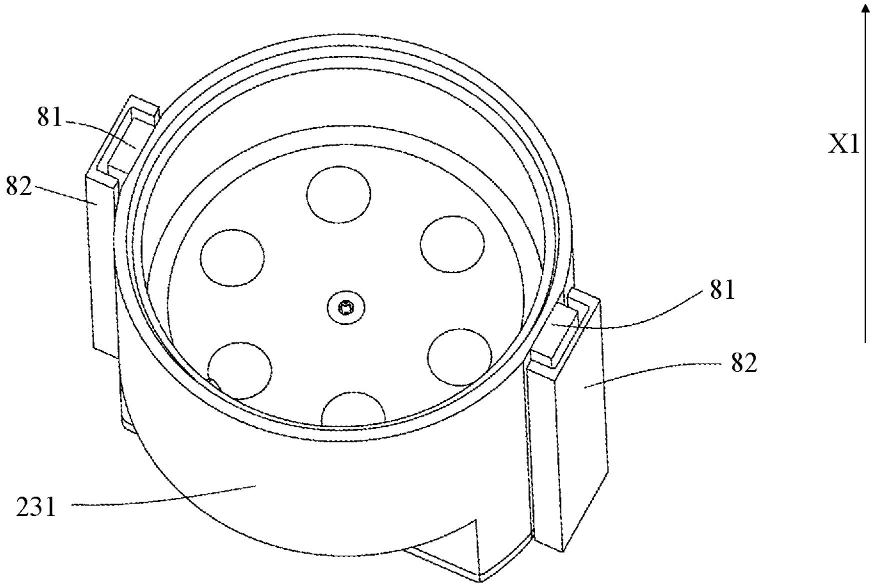
FIG. 11 is a perspective schematic view of a movable component shown in FIG. 10.

Specifically, referring to FIGS. 10-11, the third driving unit 23 may include a movable component 231 and a third driving-force mechanism 232. The movable component 231 may be a cup-shaped body. The first driving unit 21 and the second driving unit 22 may be arranged in the movable component 231. The movable component 231 is coupled to the third driving-force mechanism 232 for being driven to move along the outer shell 20 by the third driving-force mechanism 232, that is, the movable component 231 can move along a direction of the central longitudinal axis of the engine assembly 2 to drive the first driving unit 21 and the second driving unit 22 to move. When the massage machine 3 is at least partly inserted into the hollow cavity 200 of the engine assembly 2, the first driving unit 21 and the second driving unit 22 moves by following the movement of the movable component 231, the first sexual stimulation and the second sexual stimulation of the massage machine 3 are driven to move by following the movement of the first driving unit 21 and the second driving unit 22, thereby applying the third sexual stimulation for the human body part. The third sexual stimulation is the relative-displacement sexual stimulation generated along the axial direction for the human body part.

The movable component 231 may include a fixing base 2311, a movable side wall 2312 extending from the fixing base 2311 along the first direction X1, and at least one first guiding structure 81 arranged on the movable side wall 2312. The first direction X1 is perpendicular to the fixing base 2311 and is towards the direction approaching an opening of the hollow cavity 200 of the engine assembly 2.

The fixing base 2311 and the movable side wall 2312 cooperate together to define a second containing cavity 202 formed therein. The first driving unit 21 and the second driving unit 22 are arranged in the second containing cavity 202. In some embodiments, the first driving-force mechanism 212 of the first driving unit 21 is fixed to the fixing base 2311 and the second driving-force mechanism 222 of the second driving unit 22 is fixed to the fixing base 2311. The first driving side wall 2111 of the first rotation component 211 and an inner wall of the movable side wall 2312 are spaced from each other to allow the first rotation component 211 to rotate freely with respect to the movable component 231.

The at least one first guiding structure 81 is configured to cooperate with at least one second guiding structure 82 arranged on the outer shell 20 for guiding the movable component 231 to move along the outer shell 20 by the guidance of the at least one first guiding structure 81 and the at least one second guiding structure 82 under the driving of the third driving-force mechanism 232.

As shown in FIG. 11, the second guiding structure 82 may be a guide rail 82, and the first guiding structure 81 may be a slider 81 mounted in the guide rail 82. In other embodiments, the second guiding structure 82 may be a slider, and the first guiding structure 81 may be a guide rail in cooperation with the slider. The first guiding structure 81 and the second guiding structure 82 cooperate with each other to improve the stability of the movable component 231 moving in the engine assembly 2. Of course, it can be understood by those skilled in the art that the first guiding structure 81 and the second guiding structure 82 may be other types of guiding devices that cooperate with each other, which is not limited herein.

Further referring to FIG. 10, the third driving-force mechanism 232 may include a third motor 2321 and a transmission assembly 2322.

In some embodiments, the third motor 2321 is an electric motor, such as an electric stepper motor. The third motor 2321 may be fixedly connected to the outer shell 20. The transmission assembly 2322 is configured to convert the driving force output by the third motor 2321 into a driving force for reciprocal movement in the first direction X1 or the second direction X2 to drive the movable component 231 in the first direction X1 or the second direction X2.

Specifically, the transmission assembly 2322 may be a crank linkage kinematic subassembly and includes a crank 23221 and a connecting rod 23222. The connecting rod 23222 is fixedly connected to the fixing base 2311 of the movable component 231 to move together with the movable component 231. The transmission assembly 2322 may also have other forms in the context of achieving the purpose of the present disclosure, which is not limited herein.

In some embodiments, a power supply, a control unit, a communication unit, etc. may also be arranged in the engine assembly 2. The power supply is configured to provide electricity. The control unit is configured to independently control the first driving unit 21, the second driving unit 22, and the third driving unit 23, etc., respectively. The communication unit is configured to communicate with an outside through wired or wireless communication means such as data lines, Wi-Fi, Bluetooth, etc. to receive control signals. The control unit controls the operation of the sexual massage apparatus according to the control signal. The control signal may be a control signal corresponding to a sexual stimulation scenario in a video segment generated by parsing the video segment with the sexual stimulation scenario, such that when the video segment is played by a video play device, the sexual massage apparatus 1 may synchronize the stimulation massage according to the control signal.

Moreover, the engine assembly 2 may be further arranged with a control panel for receiving a feedback control signal. The feedback control signal may be configured to adjust the driving forces provided by the first driving unit 21, the second driving unit 22 and the third driving unit 23. In addition, the feedback control signal may also be configured to adjust playing operations of the video segment on the video play device, such as, fast forward of the video segment, rewind of the video segments, play and pause of the video segment, volume level of the video segment, picture brightness of the video segment, etc. In some embodiments, the control panel may be a touch control panel.

The massage machine 3 of the present disclosure will be described hereinafter with specific reference to FIGS. 12-18. In an embodiment of the present disclosure, the massage machine 3 is suitable for massage stimulation of the penis and is detachably inserted at least partially within the hollow cavity 200 of the engine assembly 2.

As shown in FIG. 12, the massage machine 3 may further include an outer fixing frame 30. The first sexual stimulation unit 31 of the massage machine 3 may include an outer cup-shaped body 310 and a first massage body 311.

A first end of the first massage body 311 is fixedly connected to an end of the outer fixing frame 30 far away from the outer cup-shaped body 310. Specifically, the first end of the first massage body 311 may be glued to the end of the outer fixing frame 30 far away from the outer cup-shaped body 310. A second end of the first massage body 311 opposite to the first end is coupled to the outer cup-shaped body 310. Specifically, the second end of the first massage body 311 is fixedly connected to the outer cup-shaped body 310. The first massage body 311 surrounds the outer fixing frame 30 and an annular lower edge of the first massage body 311 is fixedly connected to the outer cup-shaped body 310, thereby forming a first massage cavity 3110.

Further referring to FIG. 10, when the massage machine 3 is at least partly inserted into the engine assembly 2, the outer cup-shaped body 310 is inserted into the hollow cavity 200 of the engine assembly 2 and controlled by the first driving unit 21, for being driven to perform the first rotating motion by the first driving force supplied from the first driving unit 21, thus the second end of the first massage body 311 is driven to rotate by following the rotation of the outer cup-shaped body 310. The first end of the first massage body 311 is fixed to the end of the outer fixing frame 30 far away from the outer cup-shaped body 310. Therefore, the second end of the first massage body 311 rotates relative to the first end of the first massage body 311, thus twisting the first massage body 311. The first massage body 311 produces deformation, and the size of the inner diameter of the first massage cavity 3110 changes, thereby applying the compression sexual stimulation generated along the radial direction on the human body part.

Figure 14:
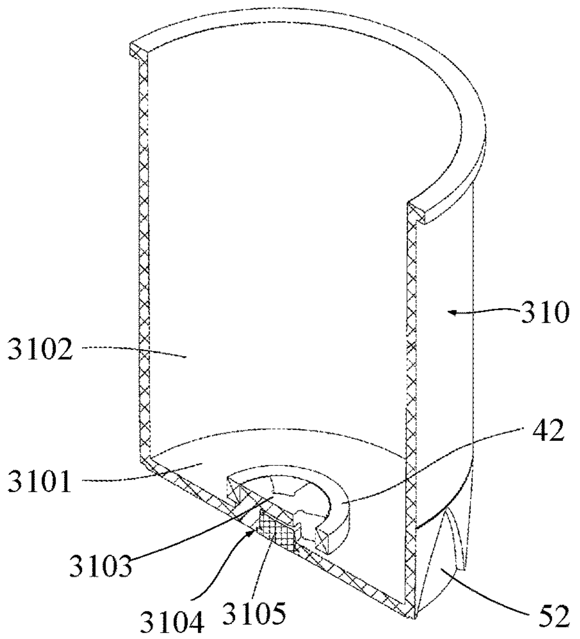
FIG. 14 is a partial sectional view of an outer cup-shaped body shown in FIG. 13.

Referring to FIG. 14, as described above, the outer cup-shaped body 310 is provided with the at least one second coupling mechanism 52 configured to couple with the at least one first coupling mechanism 51 arranged on the first driving unit 21, for being driven to perform the first operation to rotate by the first driving force supplied from the first driving unit 21.

Further referring to FIG. 2, when the massage machine 3 is inserted into the hollow cavity 200 of the engine assembly 2, the outer cup-shaped body 310 is inserted in the first containing cavity 201 defined by the first driving unit 21. The outer cup-shaped body 310 is driven by the first driving unit 21 to perform the first rotating motion through the snap fit between the second coupling mechanism 52 on the outer cup-shaped body 310 and the first coupling mechanism 51 of the first driving unit 21. In the embodiments, the rotation axis of the first driving force provided by the first driving unit 21 is co-axial with the rotation axis of the first sexual stimulation unit 31 including the outer cup body 310 to perform the first rotating motion.

Referring to FIGS. 12-13, the outer fixing frame 30 may include an outer side wall 300, a first limiting wall 301 extending from an end of the outer side wall 300, a second limiting wall 302 extending from the other opposite end of the outer side wall 300. The first limiting wall 301 is arranged on the end of the outer side wall 300 far away from the outer cup-shaped body 310, and the second limiting wall 302 is arranged on the other opposite end of the outer side wall 300 close to the outer cup-shaped body 310.

The first end of the first massage body 311 is fixedly connected to the first limiting wall 301, and the first massage body 311 extends from the first limiting wall 301.

Specifically, as shown in FIG. 12, the first massage body 311 may include a surface massage portion 3111 and a tube massage portion 3112. The surface massage portion 3111 extends from the first limiting wall 301 along a direction far away from the outer cup-shaped body 310. The surface massage portion 3111 has an opening 31111 defined therein and configured for facilitating the penis to enter the first massage cavity 3110 via the opening 31111. The tube massage portion 3112 extends from the surface massage portion 3111 along a direction close to the outer cup-shaped body 310. The tube massage portion 3112 and the surface massage portion 3111 may be a one-piece structure. The tube massage portion 3112 may extend from the surface massage portion 3111 in the direction close to the outer cup-shaped body 310 at the position of the first limiting wall 301.

In some embodiments, the opening 31111 is a circular opening with a diameter less than the inner diameter of the first massage cavity 3110 at the tube massage portion 3112. The first massage body 311 is a one-piece structure, which can be made of soft gel.

In addition, as shown in FIG. 13, the massage machine 3 may further include an inner fixing frame 33 at least partly arranged between the outer fixing frame 30 and the tube massage portion 3112. The inner fixing frame 33 includes an inner side wall 331 and an inner limiting edge 332 extending from an end of the inner side wall 331. An end of the tube massage portion 3112 is fixedly coupled to an end of the inner fixing frame 33 close to the outer cup-shaped body 310. The end of the inner fixing frame 33 close to the outer cup-shaped body 310 is coupled to the outer cup-shaped body 310, for being driven to rotate by following the rotation of the outer cup-shaped body 310 and driving the end of the tube massage portion 3112 close to the outer cup-shaped body 310 to rotate. The inner limiting edge 332 is limited between the first limiting wall 301 and the second limiting wall 302 to make the inner fixing frame 33 be able to freely move in a space defined by the first limiting wall 301 and the second limiting wall 302.

As shown in FIG. 13, the inner side wall 331 of the inner fixing frame 33 is an annular wall spaced from each other with the outer side wall 300 of the outer fixing frame 30. At least a portion of the inner side wall 331 extends beyond the second limiting wall 302 of the outer fixing frame 30 in the second direction X2 for coupling with the outer cup-shaped body 310.

Figure 15:
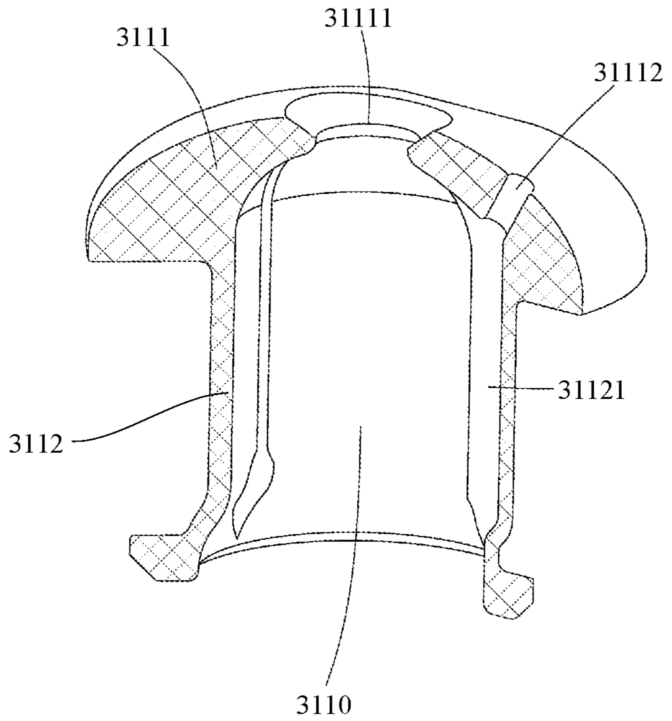
FIG. 15 is a partial sectional view of a first massage body shown in FIG. 13.
Figure 16:
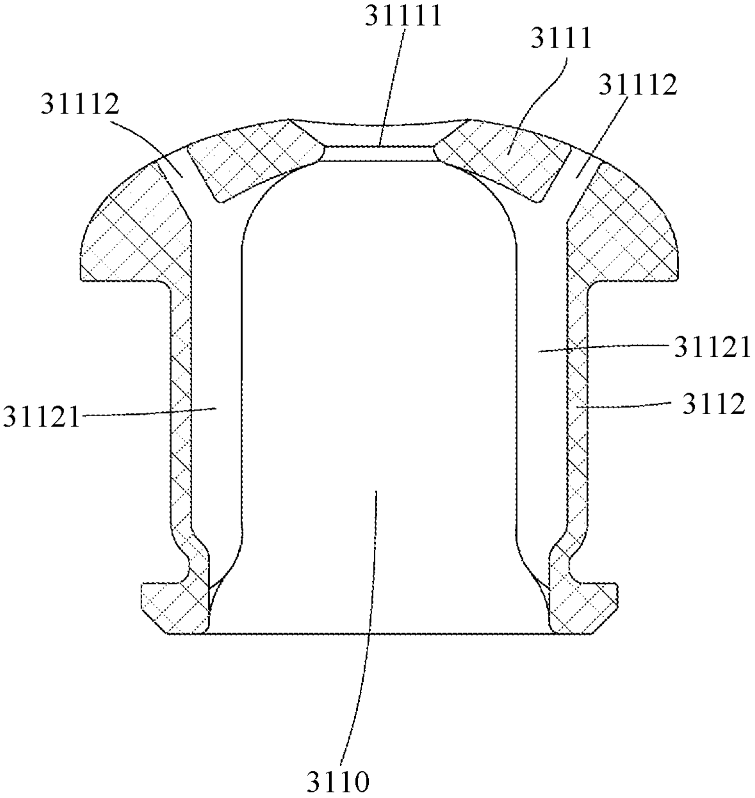
FIG. 16 is a sectional view of the first massage body shown in FIG. 15.

Further referring to FIGS. 15-16, the surface massage portion 3111 has at least one gas vent 31112 formed therein, and the tube massage portion 3112 has at least one gas channel 31121 formed therein. The at least one gas channel 31121 is communicated with the at least one gas vent 31112 and communicated with the first massage cavity 3110, such that the first massage cavity 3110 is also communicated with the outer environment via the at least one gas channel 31121 and the at least one gas vent 31112.

By the arrangement of the interconnected gas channel 31121 and gas vent 31112 which are defined in the first massage body 311, the first massage cavity 3110 can be communicated with the outer environment via the gas channel 31121 and the gas vent 31112. Therefore, when the massage machine 3 is in use and the first massage body 311 produces deformation, it can effectively maintain the communication between the massage machine 3 and the outer environment, avoiding intense difference between the internal and external air pressure that may cause inconvenient in use and affect user experience.

FIG. 16 schematically illustrates two gas vents 31112 running in a thickness direction of the surface massage portion 3111 and two gas channels 31121 arranged on the tube massage portion 3112, but it will be understood by those skilled in the art that the number of gas vents 31112 and gas channels 31121 may be set according to actual needs.

Figure 18:
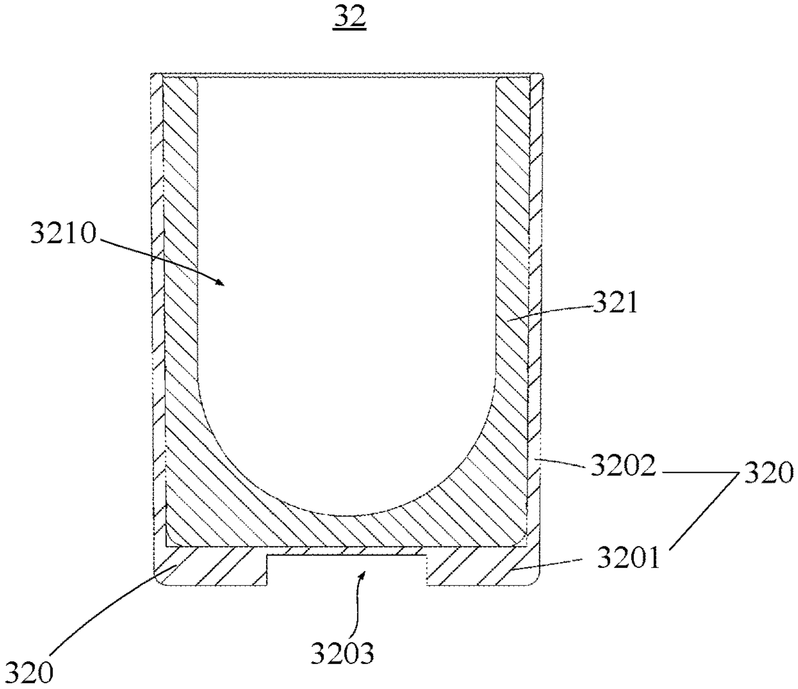
FIG. 18 is a sectional view of the inner cup-shaped body and the second massage body shown in FIG. 17.

Referring to FIGS. 17-18, the second sexual stimulation unit 32 of the massage machine 3 may include an inner cup-shaped body 320 and a second massage body 321. The inner cup-shaped body 320 may be arranged in the outer cup-shaped body 310, and the second massage body 321 is arranged along an inner surface of the inner cup-shaped body 320 to form a second massage cavity 3210. When the massage machine 3 is at least partly inserted into the engine assembly 2, a driving-force transmission cooperation is arranged between the inner cup-shaped body 320 and the second driving unit 22, for facilitating the inner cup-shaped body 320 able to perform the second rotating motion by the second driving force supplied from the second driving unit 22 and drive the second massage body 321 to rotate for applying the rotation sexual stimulation generated along the circumferential direction for the human body part (e.g., the penis).

Moreover, as shown in FIGS. 12-13, the first massage cavity 3110 and the second massage cavity 3210 are interconnected. In some embodiments, the first massage cavity 3110 and the second massage cavity 3210 have substantially the same inner diameter.

As shown in FIG. 18, the inner cup-shaped body 320 may include an inner cup bottom 3201 and an inner cup side wall 3202 extending from the inner cup bottom 3201. As shown in FIG. 17, the inner cup bottom 3201 of the inner cup-shaped body 320 is provided with at least one second driving-force transmission mechanism 62 configured to form the driving-force transmission cooperation with at least one first driving-force transmission mechanism 61 arranged on the second driving unit 22 as shown in FIGS. 4 and 8, for being driven to perform the second rotating motion by the second driving force supplied from the second driving unit 22.

In some embodiments, the number of the at least one second driving-force transmission mechanism 62 is more than one, and the second driving-force transmission mechanisms 62 are arranged at uniformly spaced circularly in the inner cup bottom 3201. The second driving-force transmission mechanism 62 may be a second magnet component 62, for example, a permanent magnet.

In the present disclosure, the at least one second driving-force transmission mechanism 62 may have the same number and/or size as the at least one first driving-force transmission mechanism 61 in the turntable 2211 of the second rotation component 221 of the second driving unit 22. The second driving-force transmission mechanisms 62 and first driving-force transmission mechanisms 61 match one by one to form a driving-force transmission connection between the second rotation component 221 and the inner cup-shaped body 320, such that the rotation of the second rotation component 221 can drive the inner cup-shaped body 320 to rotate. Of course, it can be understood by those skilled in the art that the number and/or size of the second driving-force transmission mechanisms 62 may also be set differently from the number and/or size of the first driving-force transmission mechanisms 61, and that one second driving-force transmission mechanism 62 may match a plurality of first driving-force transmission mechanisms 61, or that one first driving-force transmission mechanism 61 may match a plurality of second driving-force transmission mechanisms 62 to form a driving-force transmission connection between the second rotation component 221 and the inner cup-shaped body 320, such that the rotation of the second rotation component 221 can drive the inner cup-shaped body 320 to rotate.

In the embodiments, the second driving-force transmission mechanism 62 and the first driving-force transmission mechanism 61 are respectively mutually attractive magnet components, such that the driving-force transmission connection is formed between the second rotation component 221 and the inner cup-shaped body 320 by magnetic suction between the two. Of course, it can be understood by those skilled in the art that the second driving-force transmission mechanism 62 and the first driving-force transmission mechanism 61 may also be applied with other non-contact driving-force transmission components.

The coupling between the outer cup-shaped body 310 and the inner cup-shaped body 320 is described below, referring to FIG. 14. The outer cup-shaped body 310 may include an outer cup bottom 3101 and an outer cup side wall 3102 extending from the outer cup bottom 3101. The outer cup bottom 3101 has a protruding part 3103 in the center thereof. As shown in FIG. 18, the inner cup bottom 3201 of the inner cup-shaped body 320 has a recess 3203 corresponding to the protruding part 3103. Further referring to FIG. 17, the protruding part 3103 of the outer cup-shaped body 310 is arranged in the recess 3203 of the inner cup-shaped body 320 via a second bearing 42. The coupling between the outer cup-shaped body 310 and the inner cup-shaped body 320 is achieved via the second bearing 42. Therefore, the inner cup-shaped body 320 may be able to freely rotate relative to the outer cup-shaped body 310.

In the embodiments, the outer cup-shaped body 310 is arranged with the protruding part 3103 on the outer cup bottom 3101, and the inner cup bottom 3201 of the inner cup-shaped body 320 is snapped onto the protruding part 3103 by the second bearing 42. Therefore, a certain clearance is created between the inner cup bottom 3201 of the inner cup-shaped body 320 and the outer cup bottom 3101 of the outer cup-shaped body 310, which further ensures that the inner cup-shaped body 320 can rotate freely relative to the outer cup-shaped body 310.

Of course, it can be understood by those skilled in the art that the outer cup bottom 3101 of the outer cup-shaped body 310 may also define a recess, while the inner cup bottom 3201 of the inner cup-shaped body 320 is arranged with a corresponding protruding part, and the protruding part of the inner cup-shaped body 320 is arranged in the recess of the outer cup-shaped body 310 by means of a bearing, forming the coupling between the outer cup-shaped body 310 and the inner cup-shaped body 320.

Moreover, the outer cup-shaped body 310 of the massage machine 3 may further include a cleaning through-hole and a closing cover body formed thereon for cleaning the massage machine 3. In the embodiments, as shown in FIGS. 14 and 17, the protruding part 3103 of outer cup-shaped body 310 may define a cleaning through-hole 3104, and a position of the outer cup-shaped body 310 near the protruding part 3103 is arranged with a closing cover body 3105 connected to the outer cup-shaped body 310. During the cleaning process of the massage machine 3, the closing cover body 3105 is pulled out of the cleaning through-hole 3104 to open the cleaning through-hole 3104 for facilitating the leakage of the cleaning liquid. When the massage machine 3 is not being cleaned, the closing cover body 3105 may be inserted in the cleaning through-hole 3104 to cover the cleaning through-hole 3104.

In some embodiments, as shown in FIG. 14, the protruding part 3103 of the outer cup-shaped body 310 may be arranged with a plurality of spaced apart co-circular fan-shaped peripheries with gaps between adjacent fan-shaped peripheries to communicate with the cleaning through-hole 3104.

Referring together to FIG. 13, during the cleaning process of the massage machine 3, cleaning fluid may be continuously injected into the first massage cavity 3110 and the second massage cavity 3210 in the massage machine 3, such that the cleaning fluid may reach the outer cup bottom 3101 of the outer cup-shaped body 310 by passing through the gap between the inner cup side wall 3202 of the inner cup-shaped body 320 and the outer cup side wall 3102 of the outer cup-shaped body 310, and then discharge through the cleaning through-hole 3104 and the gaps between adjacent fan-shaped peripheries of the protruding part 3103 on the outer cup bottom 3101 of the outer cup-shaped body 310, so as to achieve the purpose of cleaning the massage machine 3 without the need to disassemble the massage machine 3, which greatly facilitates the use of the user.

In addition, it can be understood by those skilled in the art that the cleaning through-hole 3104 and the closing cover body 3105 may also be arranged at other locations of the outer cup-shaped body 310, such as in an area of the outer cup side wall 3102 of the outer cup-shaped body 310 near a lower edge or in other areas of the outer cup bottom 3101 of the outer cup-shaped body 310 not being the protruding part 3103.

In addition, further referring to FIG. 1, in the present disclosure, the cover 4 may be further opened with an air hole 40 penetrating through the cover 4. The air hole 40 is arranged facing the opening 31111 of the surface massage portion 3111, such that the air hole 40 may be interconnected with the first massage cavity 3110 and the second massage cavity 3210. After the massage machine 3 is cleaned and covered with the cover 4, the massage machine 3 covered with the cover 4 may be placed upside down or the whole sexual massage apparatus 1 may be placed upside down, such that the cleaning liquid left over from cleaning the massage machine 3 may be discharged through the air hole 40 in the cover 4, promoting the drying of the massage machine 3. Moreover, when the sexual massage apparatus 1 is placed in a non-working state, the air hole 40 defined in the cover 4 may make the first massage cavity 3110 and the second massage cavity 3210 maintain communication with the outer environment to keep the massage machine 3 dry and avoid the breeding of bacteria. In some embodiments, the air hole 40 defined in the cover 4 may be designed in the style of the company's logo.

Referring further to FIG. 13, the outer fixing frame 30 of the massage machine 3 may be further arranged with a first locking mechanism 34, and correspondingly, as shown in FIG. 10, the outer shell 20 of the engine assembly 2 is arranged with a corresponding second locking mechanism 24. Through the cooperation of the first locking mechanism 34 and the second locking mechanism 24, when the massage machine 3 is at least partially inserted in the hollow cavity 200 of the engine assembly 2, the outer fixing frame 30 of the massage machine 3 is locked together with the outer shell 20 of the engine assembly 2.

In the embodiments, the first locking mechanism 34 may be adopted with a first magnet device, for example, a permanent magnet; correspondingly, the second locking mechanism 24 may be adopted with a corresponding second magnet device, for example, a permanent magnet. As shown in FIG. 13, the first magnet device (the first locking mechanism) 34 may be arranged on the second limiting wall 302 of the outer fixing frame 30 of the massage machine 3. Correspondingly, as shown in FIG. 10, the second magnet device (the second locking mechanism) 24 may be arranged at the opening of the outer shell 20 of the engine assembly 2. Therefore, when the massage machine 3 is at least partially inserted into the hollow cavity 200 of the engine assembly 2, the first magnet device 34 and the second magnet device 24 are magnetically attracted to each other, thereby locking the outer fixing frame 30 of the massage machine 3 to the outer shell 20 of the engine assembly 2.

Of course, those skilled in the art can understand that the first locking mechanism 34 and the second locking mechanism 24 can also be implemented in other ways, such as a mating snap connection device or a mating thread connection device arranged on the outer fixing frame 30 of the massage machine 3 and the outer shell 20 of the engine assembly 2 respectively, which is not limited herein.

Referring together to FIGS. 1-18, the working principle of the sexual massage apparatus of the present disclosure will be described specifically hereinafter. As mentioned above, when the sexual massage apparatus 1 is in operation, the massage machine 3 is at least partially inserted into the hollow cavity 200 of the engine assembly 2, and the engine assembly 2 can control the first driving-force mechanism 212 of the first driving unit 21 to drive the first rotation component (driving base) 211 to perform the first rotating motion to generate the first driving force. The first rotation component (driving base) 211 drives the outer cup-shaped body 310 of the first sexual stimulation unit 31 to rotate, and the outer cup-shaped body 310 then drives the inner fixing frame 33 to rotate. The second end of the first massage body 311 near the engine assembly 2 is fixedly connected to the inner fixing frame 33, and therefore rotates with the inner fixing frame 33. While the first end of the first massage body 311 away from the engine assembly 2 is fixedly connected to the outer fixing frame 30, so the second end of the first massage body 311 twists relative to the first end of the first massage body 311. In this way, the first massage body 311 produces deformation, changing the inner diameter of the first massage cavity 3110, so as to produce the compression sexual stimulation generated along the radial direction for the penis, that is, the first sexual stimulation.

In addition, the engine assembly 2 can also control the second driving-force mechanism 222 of the second driving unit 22 to drive the second rotation component 221 to perform the second rotating motion, generating the second driving force. Through the driving-force transmission between the first magnet component (the first driving-force transmission mechanism) 61 on the turntable 2211 of the second rotation component 221 and the second magnet component (the second driving-force transmission mechanism) 62 of the inner cup-shaped body 320 of the second sexual stimulation unit 32, the inner cup-shaped body 320 of the second sexual stimulation unit 32 and the second massage body 321 arranged on the inner cup-shaped body 320 are driven to rotate, thereby producing the rotation sexual stimulation generated along the circumferential direction for the penis of the user, that is, the second sexual stimulation. The rotation axis of the first rotating motion performed by the first rotation component (driving base) 211 is co-axial with the rotation axis of the second rotating motion performed by the second rotation component 221.

In addition, the engine assembly 2 can control the third driving-force mechanism 232 of the third driving unit 23 to drive the movable component 231 to move axially to generate the third driving force. The first driving unit 21 and the second driving unit 22 arranged in the movable component 231 subsequently perform axial movement, such that a portion of the first massage body 311 and the second massage body 321 move axially or deform in the axial direction with the first driving unit 21 and the second driving unit 22 to produce relative axial movement to the penis inserted in the first massage cavity 3110 and the second massage cavity 3210 to produce the relative-displacement sexual stimulation generated along the axial direction for the penis, that is, the third sexual stimulation. And the first limiting wall 301 and the second limiting wall 302 arranged on the outer fixing frame 30 of the massage machine 3 can limit the range of movement of the outer cup-shaped body 310 and the inner cup-shaped body 320, thus limiting the range of relative displacement.

The sexual massage apparatus 1 of the present disclosure can apply stimulation in three different dimensions to the penis, such as in radial, circumferential or axial directions. In particular, the sexual massage apparatus 1 of the present disclosure can produce compression sexual stimulation to the penis in the radial direction, which can greatly stimulate the penis and enhance the stimulation effect, and can bring the user great pleasure.

In addition, those skilled in the art can understand that the sexual massage apparatus 1 of the present disclosure can also be designed to achieve only one or two of the three stimulations in different dimensions as described above, for example, the first sexual stimulation in the radial direction (compression sexual stimulation), or the second sexual stimulation in the circumferential direction (rotation sexual stimulation) added to the first sexual stimulation in the radial direction (compression sexual stimulation), or the third sexual stimulation in the axial direction (relative-displacement sexual stimulation) added to the first sexual stimulation in the radial direction (compression sexual stimulation), etc., which can be freely adjusted.

It should be noted that the engine assembly 2 and the massage machine 3 of the sexual massage apparatus 1 of the present disclosure are separate parts, and both can be packaged into two independent products. The engine assembly 2 is designed to provide the driving force(s) to achieve the above stimulation, so the engine assembly 2 can be designed as a universal driving-force device to match different types or different sizes of the massage machine 3, thereby greatly reducing usage cost and meeting the needs of different users. The massage machine 3 which may be easily damaged can be replaced independently, greatly reducing replacement cost.

The sexual massage apparatus of the present disclosure is described above as an example of a massage machine 3 suitable for sexual stimulating the penis. Of course, the sexual massage apparatus of the present disclosure may also include a massage machine suitable for sexual stimulating the vagina, which may also be detachably inserted at least partially into the engine assembly 2 described above for three different dimensions of sexual stimulation in radial, circumferential or axial directions.

Figure 19:
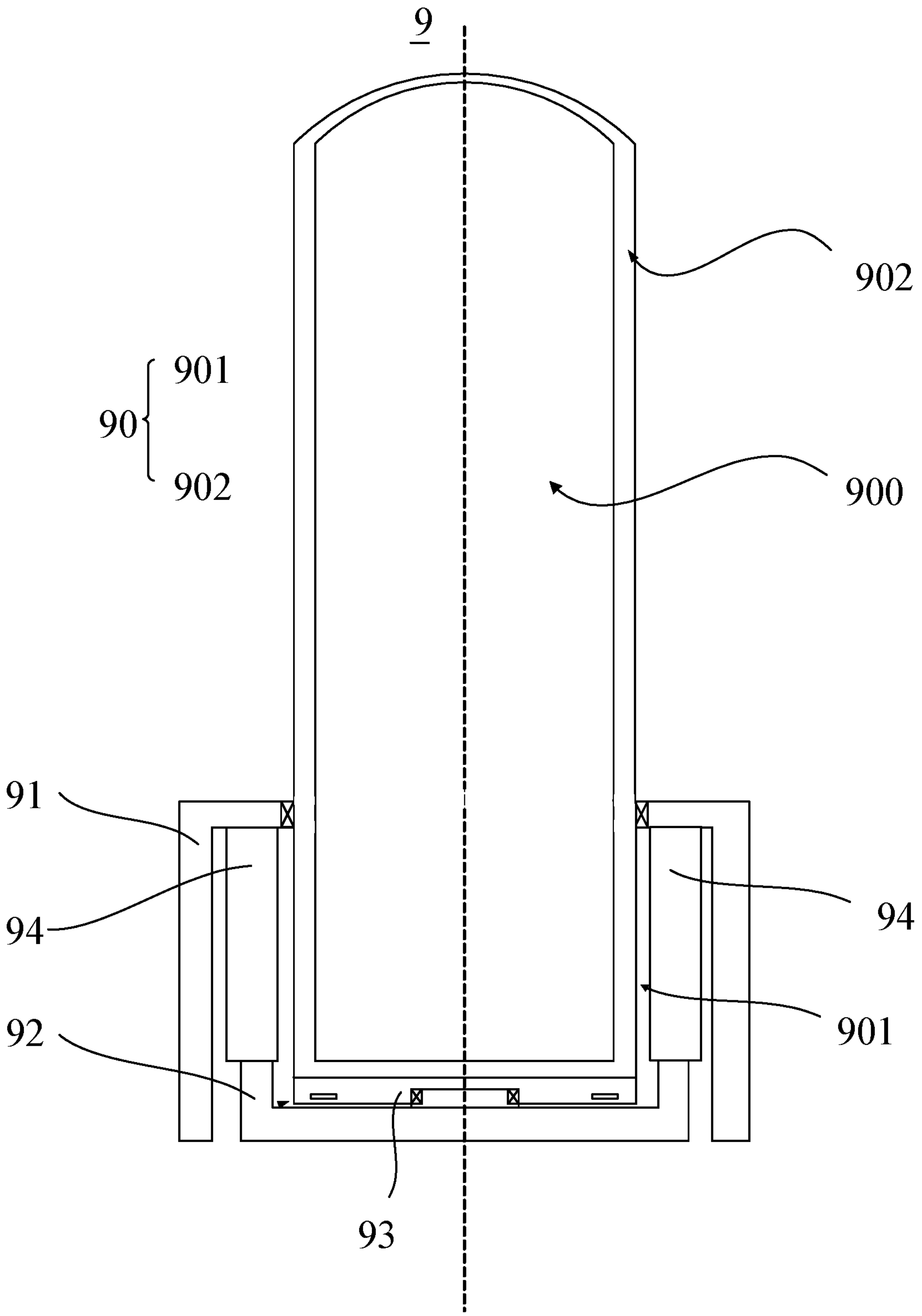
FIG. 19 is a structural view of a massage machine according to another embodiment of the present disclosure.

Specifically, as shown in FIG. 19, which illustrates a massage machine 9 for sexual stimulating the vagina. The massage machine 9 may also be detachably inserted at least partially into the hollow cavity 200 of the engine assembly 2 described above to perform radial, circumferential, or axial sexual stimulation in three different dimensions.

Specifically, the massage machine 9 includes a massage body 90, a shell 91, a cup-shaped body 92, and a rotating base 93.

An elastomer 94 is arranged between the shell 91 and the cup-shaped body 92. The rotating base 93 is arranged in the cup-shaped body 92, and the massage body 90 is fixedly connected to the rotating base 93. The massage body 90 defines an inner massage cavity 900. The massage body 90 is divided into a first part 901 arranged in the shell 91 and a second part 902 exposed outside the shell 91. An outer wall of the massage body 90 may be made of elastic deformation material. The inner massage cavity 900 is filled with liquid. In addition, the second part 902 of the massage body 90 may be arranged with a plurality of stimulation protrusions on the outer wall.

When the massage machine 9 is at least partially inserted into the hollow cavity 200 of the engine assembly 2, the cup-shaped body 92 is configured to connect with the first rotation component (driving base) 211 of the first driving unit 21 of the engine assembly 2. The connection of the cup-shaped body 92 to the first rotation component 211 is similar to the connection of the outer cup-shaped body 310 of the massage machine 3 to the first rotation component 211 above, and will not be described herein.

Therefore, when the first rotation component (driving base) 211 of the first driving unit 21 of the engine assembly 2 rotates to provide the first driving force, the cup-shaped body 92 rotates by following the rotation of the first rotation component 211. An end of the elastomer 94 is fixed to the shell 91, while the other end of the elastomer 94 is fixed to the cup-shaped body 92 to twist with the rotation of the cup-shaped body 92, thereby deforming the elastomer 94. The deformation of the elastomer 94 then squeezes the liquid in the massage cavity 900 corresponding to the first part 901 of the massage body 90, such that the liquid in the massage cavity 900 moves from the first part 901 of the massage body 90 to the second part 902, then the second part 902 of the massage body 90 expands and thickens in the radial direction, and produces a first sexual stimulation of compression in the radial direction to the vagina.

That is, the massage body 90, the cup-shaped body 92, and the elastomer 94 in the massage machine 9 together form a first sexual stimulation unit to produce the first sexual stimulation of compression in the radial direction to the vagina.

Similarly, the rotating base 93 arranged inside the cup-shaped body 92 is configured to form a driving-force connection with the second rotation component 221 of the second driving unit 22 of the engine assembly 2, and the driving-force connection between the rotating base 93 and the second rotation component 221 is similar to the driving-force connection between the inner cup-shaped body 320 of the massage machine 3 and the second rotation component 221 stated above, and will not be described here.

Therefore, when the second rotation component 221 of the second driving unit 22 of the engine assembly 2 rotates to provide the second driving force, the rotating base 93 rotates by following the rotation of the second rotation component 221, thereby driving the massage body 90 thereon to rotate, producing a second sexual stimulation of rotation in the circumferential direction to the vagina.

That is, the massage body 90 and the rotating base 93 in the massage machine 9 together form a second sexual stimulation unit to produce the second sexual stimulation of rotation in the circumferential direction to the vagina.

Similarly, when the third driving unit 23 of the engine assembly 2 drives the movable member 231 to drive the first driving unit 21 and the second driving unit 22 to move axially, the cup-shaped body 92, the rotating base 93 and the massage body 90 move axially with the first driving unit 21 and the second driving unit 22 to produce a third sexual stimulation of relative movement in the axial direction to the vagina.

In summary, the sexual massage apparatus of the present disclosure can apply three different dimensions of stimulation to the user's body parts in radial, circumferential or axial directions. In particular, the sexual massage apparatus can produce compression sexual stimulation in the radial direction for the human body part, which can greatly stimulate the body part and enhance the stimulation effect, and can bring the user great pleasure.

In the description of the present disclosure, reference is made to the terms "an implementation", "some implementations", "an embodiment", "some embodiments", "in an optional embodiment", "specifically", "example", "specific example", or "some examples" means that the specific features, structures, materials, or characteristics described in connection with the embodiments or examples are included in at least one embodiment or example of the present disclosure In this specification, the schematic representation of the above terms does not necessarily refer to a same embodiment or example. Further, the specific features, structures, materials, or characteristics described may be combined in any one or more embodiments or examples in a suitable manner.

The foregoing is a further detailed description of the present disclosure in conjunction with specific embodiments, and it cannot be assumed that the specific embodiments of the present disclosure are limited to these descriptions. For those skilled in the art, several simple derivations or substitutions can be made without departing from the conception of the present disclosure.

What is claimed is:

1. A sexual massage apparatus, comprising:

an engine assembly, comprising an outer shell and a first driving unit, wherein the outer shell defines a hollow cavity therein, and the first driving unit is arranged in the hollow cavity and configured to supply a first driving force; and a massage machine, capable of being at least partly inserted into the hollow cavity of the engine assembly and capable of being separated from the engine assembly, wherein the massage machine comprises a first sexual stimulation unit; when the massage machine is at least partly inserted into the hollow cavity of the engine assembly, the first sexual stimulation unit is controlled by the first driving unit, to perform a first operation under the first driving force and apply a first sexual stimulation for a human body part, and the first sexual stimulation is a compression sexual stimulation generated along a radial direction for the human body part;

the engine assembly further comprises a second driving unit, and the massage machine further comprises a second sexual stimulation unit; the second driving unit is arranged in the hollow cavity of the engine assembly and configured to supply a second driving force;

when the massage machine is at least partly inserted into the hollow cavity of the engine assembly, the second sexual stimulation unit is controlled by the second driving unit, to perform a second operation under the second driving force and apply a second sexual stimulation for the human body part, and the second sexual stimulation is a rotation sexual stimulation generated along a circumferential direction for the human body part.

2. The sexual massage apparatus as claimed in claim 1, wherein the first driving force supplied from the first driving unit is a first rotation driving force, the first operation performed by the first sexual stimulation unit is a first rotation operation under the first rotation driving force, to generate the compression sexual stimulation along the radial direction for the human body part, and a rotation axis of the first rotation driving force supplied from the first driving unit is co-axial with a rotation axis of the first rotation operation performed by the first sexual stimulation unit.

3. The sexual massage apparatus as claimed in claim 1, wherein, the engine assembly further comprises a third driving unit, arranged in the hollow cavity of the engine assembly and configured to supply a third driving force;

when the massage machine is at least partly inserted into the hollow cavity of the engine assembly, the first sexual stimulation unit and the second sexual stimulation unit are driven under the third driving force, to perform a third operation and apply a third sexual stimulation for the human body part, and the third sexual stimulation is a relative-displacement sexual stimulation generated along an axial direction for the human body part.

4. The sexual massage apparatus as claimed in claim 3, wherein, the third driving unit comprises a movable component and a third driving-force mechanism; wherein the first driving unit and the second driving unit are arranged in the movable component; the movable component is coupled to the third driving-force mechanism for being driven to move along the outer shell by the third driving-force mechanism, for driving the first driving unit and the second driving unit to move by following a movement of the movable component;

when the massage machine is at least partly inserted into the hollow cavity of the engine assembly, the first sexual stimulation unit and the second sexual stimulation unit are driven to move by following movements of the first driving unit and the second driving unit, for applying the third sexual stimulation for the human body part, and the third sexual stimulation is the relative-displacement sexual stimulation generated along the axial direction for the human body part.

5. The sexual massage apparatus as claimed in claim 4, wherein, the movable component comprises a fixing base, a movable side wall extending from the fixing base along a first direction, and at least one first guiding structure arranged on the movable side wall;

wherein the first direction is perpendicular to the fixing base and is towards a direction approaching an opening of the hollow cavity of the engine assembly; the fixing base and the movable side wall cooperate together to define a second containing cavity therein; the first driving unit and the second driving unit are arranged in the second containing cavity, and the at least one first guiding structure is configured to match at least one second guiding structure arranged on the outer shell of the engine assembly, for causing the movable component to move along the outer shell by a guidance of the at least one first guiding structure and a guidance of the at least one second guiding structure under a driving of the third driving-force mechanism.

6. The sexual massage apparatus as claimed in claim 3, wherein, the massage machine is configured for stimulating a penis.

7. The sexual massage apparatus as claimed in claim 6, wherein the massage machine further comprises an outer fixing frame;

the first sexual stimulation unit of the massage machine comprises an outer cup-shaped body and a first massage body; a first end of the first massage body is coupled to an end of the outer fixing frame away from the outer cup-shaped body, and a second end of the first massage body opposite to the first end is coupled to the outer cup-shaped body to form a first massage cavity;

when the massage machine is at least partly inserted into the hollow cavity of the engine assembly, the outer cup-shaped body is inserted into the hollow cavity and coupled with the first driving unit, for being driven to perform the first operation to rotate under the first driving force supplied from the first driving unit; the second end of the first massage body is driven to rotate by following a rotation of the outer cup-shaped body, to twist the first massage body for applying the compression sexual stimulation generated along the radial direction for the human body part.

8. The sexual massage apparatus as claimed in claim 7, wherein, the outer cup-shaped body is arranged with at least one second coupling mechanism configured to couple with at least one first coupling mechanism arranged on the first driving unit, for being driven to perform the first operation to rotate under the first driving force supplied from the first driving unit.

9. The sexual massage apparatus as claimed in claim 7, wherein, the outer fixing frame comprises an outer side wall, a first limiting wall extending from one end of the outer side wall, a second limiting wall extending from another end of the outer side wall opposite to the one end, wherein the first limiting wall is arranged on the one end of the outer side wall away from the outer cup-shaped body, and the second limiting wall is arranged on the another end of the outer side wall close to the outer cup-shaped body;

the first massage body comprises a surface massage portion and a tube massage portion, wherein the surface massage portion extends from the first limiting wall along a direction away from the outer cup-shaped body, and the surface massage portion defines an opening configured for facilitating the penis to enter the first massage cavity via the opening, and the tube massage portion extends from the surface massage portion along a direction close to the outer cup-shaped body;

the massage machine further comprises an inner fixing frame at least partly arranged between the outer fixing frame and the tube massage portion, and the inner fixing frame comprises an inner side wall and an inner limiting edge extending from an end of the inner side wall away from the outer cup-shaped body; an end of the tube massage body is fixedly coupled to an end of the inner fixing frame close to the outer cup-shaped body; the end of the inner fixing frame close to the outer cup-shaped body is coupled to the outer cup-shaped body, for being driven to rotate by following the rotation of the outer cup-shaped body and for driving the end of the tube massage body to rotate; the inner limiting edge in the inner fixing frame is limited between the first limiting wall and the second limiting wall to make the inner fixing frame able to freely move in a space defined by the first limiting wall and the second limiting wall.

10. The sexual massage apparatus as claimed in claim 9, wherein, the surface massage portion defines at least one gas vent therein, and the tube massage portion defines at least one gas channel therein; the at least one gas channel is communicated with the at least one gas vent respectively and communicated with the first massage cavity, such that the first massage cavity is also communicated with an outer environment via the at least one gas channel and the at least one gas vent when the opening of the surface massage portion is blocked by the penis.

11. The sexual massage apparatus as claimed in claim 7, wherein, the second sexual stimulation unit of the massage machine comprises an inner cup-shaped body and a second massage body, the inner cup-shaped body is arranged in the outer cup-shaped body, and the second massage body is arranged along an inner surface of the inner cup-shaped body to form a second massage cavity;

when the massage machine is at least partly inserted into the hollow cavity of the engine assembly, a driving-force transmission cooperation is formed between the inner cup-shaped body and the second driving unit, for facilitating the inner cup-shaped body able to perform the second operation to rotate under the second driving force supplied from the second driving unit and drive the second massage body to rotate for applying the rotation sexual stimulation generated along the circumferential direction for the human body part.

12. The sexual massage apparatus as claimed in claim 11, wherein, the inner cup-shaped body comprises an inner cup bottom and an inner cup side wall extending from the inner cup bottom, the inner cup bottom is arranged with at least one second driving-force transmission mechanism configured to form the driving-force transmission cooperation with at least one first driving-force transmission mechanism arranged on the second driving unit, for being driven to perform the second operation to rotate under the second driving force supplied from the second driving unit;

the outer cup-shaped body comprises an outer cup bottom and an outer cup side wall extending from the outer cup bottom; the outer cup bottom is arranged with a protruding part in a center thereof; the inner cup bottom of the inner cup-shaped body defines a recess corresponding to the protruding part; the protruding part is arranged in the recess via a second bearing to facilitate the inner cup-shaped body able to freely rotate relative to the outer cup-shaped body.

13. The sexual massage apparatus as claimed in claim 12, wherein, one of the protruding part and the outer cup-shaped body defines a cleaning through-hole and comprises a closing cover body, wherein the cleaning through-hole is configured to be open during a cleaning process of the massage machine for facilitating to leak cleaning liquid, and the closing cover body is configured to cover the cleaning through-hole.

14. The sexual massage apparatus as claimed in claim 3, wherein, the massage machine is configured for stimulating a vagina.

15. The sexual massage apparatus as claimed in claim 3, wherein, the engine assembly further comprises a control panel configured to receive a feedback control signal.

16. The sexual massage apparatus as claimed in claim 1, wherein, the first driving unit comprises a first rotation component and a first driving-force mechanism, wherein the first rotation component is coupled with the first driving-force mechanism, to rotate driven by the first driving-force mechanism for outputting the first driving force;

the second driving unit comprises a second rotation component and a second driving-force mechanism, wherein a part of the second rotation component is coupled with the first rotation component via a first bearing, to make the second rotation component able to freely rotate relative to the first rotation component; and the part of the second rotation component passes through the first bearing and is coupled with the second driving-force mechanism, to rotate under the driving of the second driving-force mechanism for outputting the second driving force.

17. The sexual massage apparatus as claimed in claim 16, wherein, the first rotation component is a driving base, comprising a driving bottom plate, a first driving side wall extending from the driving bottom plate along a first direction, and a second driving side wall extending from the driving bottom plate along a second direction; the first direction and the second direction are respectively perpendicular to the driving bottom plate, and the first direction is opposite to the second direction; the second driving side wall is arranged with an annular rack thereon for forming a tooth coupling with the first driving-force mechanism; the first driving side wall is cooperated with the driving bottom plate to define a first containing cavity;

the second rotation component comprises a turntable and a supporting portion extending from the turntable along the second direction; a center of the driving bottom plate defines a through hole, the second rotation component is arranged in the first containing cavity, and the supporting portion of the second rotation component is arranged in the through hole via the first bearing and fixedly coupled to the second driving-force mechanism through the through hole, to make the second rotation component able to freely rotate relative to the first rotation component driven by the second driving-force mechanism.

18. The sexual massage apparatus as claimed in claim 17, wherein, the first driving-force mechanism comprises a first motor and a first worm-and-gear assembly, and the first worm-and-gear assembly comprises a first worm, a first worm gear, a first supporting shaft, and a first gear; wherein the first motor is coupled to the first worm to output a driving force through the first worm; the first worm is engaged with the first worm gear for driving the first worm gear to rotate by following the first worm; one end of the first supporting shaft is fixed to the first worm gear and the other opposite end of the first supporting shaft is fixed to the first gear, such that the first supporting shaft and the first gear are driven to rotate by following a rotation of the first worm gear; the first gear is engaged with the annular rack of the second driving side wall for driving the first rotation component to rotate;

the second driving-force mechanism comprises a second motor and a second worm-and-gear assembly, and the second worm-and-gear assembly comprises an output gear, a second gear, a second worm, a second worm gear and a second supporting shaft; wherein the second motor is coupled to the output gear to output another driving force through the output gear; the output gear is engaged with the second gear for driving the second gear to rotate by following the output gear; the second worm is fixed to the second gear for being driven to rotate by following a rotation of the second gear; the second worm gear is engaged with the second worm for being driven to rotate by following a rotation of the second worm; one end of the second supporting shaft is fixed to the second worm gear and the other opposite end of the second supporting shaft is fixed to the supporting portion of the second rotation component for driving the second rotation component to rotate by following a rotation of the second worm gear.

19. The sexual massage apparatus as claimed in claim 18, wherein, the first driving side wall of the first rotation component is arranged with at least one first coupling mechanism configured to couple with at least one second coupling mechanism of the first sexual stimulation unit of the massage machine, for driving the first sexual stimulation unit to perform the first operation and apply the first sexual stimulation;

the turntable of the second rotation component is arranged with at least one first driving-force transmission mechanism configured to form a driving-force transmission cooperation with at least one second driving-force transmission mechanism of the second sexual stimulation unit of the massage machine, for driving the second sexual stimulation unit to perform the second operation and apply the second sexual stimulation.

20. The sexual massage apparatus as claimed in claim 19, wherein, each of the at least one first coupling mechanism is a first clamping component, and each of the at least one second coupling mechanism is a second clamping component matching the first clamping component;

each of the at least one first driving-force transmission mechanism is a first magnet component, and each of the at least one second driving-force transmission mechanism is a second magnet component matching the first driving-force transmission mechanism.

21. The sexual massage apparatus as claimed in claim 1, further comprising:

a cover, configured to cover an exposed part of the massage machine; wherein the cover defines an air hole penetrating the cover.

22. An engine assembly, compatible with massage machines in at least one type, and configured to contain a massage machine and drive the massage machine to perform a sexual stimulation operation;

wherein the engine assembly comprises an outer shell and a first driving unit, the outer shell defines a hollow cavity therein, and the first driving unit is arranged in the hollow cavity and configured to supply a first driving force;

when the massage machine is at least partly inserted into the hollow cavity of the engine assembly, the first driving unit is configured to drive a first sexual stimulation unit of the massage machine to perform a first operation under the first driving force and apply a first sexual stimulation for a human body part, and the first sexual stimulation is a compression sexual stimulation generated along a radial direction for the human body part;

wherein the engine assembly further comprises a second driving unit arranged in the hollow cavity and configured to supply a second driving force;

when the massage machine is at least partly inserted into the hollow cavity of the engine assembly, the second driving unit is configured to drive a second sexual stimulation unit of the massage machine to perform a second operation under the second driving force and apply a second sexual stimulation for the human body part, and the second sexual stimulation is a rotation sexual stimulation generated along a circumferential direction for the human body part.

23. The engine assembly as claimed in claim 22, wherein the engine assembly further comprises a third driving unit arranged in the hollow cavity and configured to supply a third driving force;

when the massage machine is at least partly inserted into the hollow cavity of the engine assembly, the third driving unit is configured to drive the first sexual stimulation unit and the second sexual stimulation unit of the massage machine to perform a third operation under the third driving force and apply a third sexual stimulation for the human body part, and the third sexual stimulation is a relative-displacement sexual stimulation generated along an axial direction for the human body part.

24. A massage machine, capable of being at least partly inserted into a hollow cavity of an engine assembly and capable of being separated from the engine assembly, wherein the massage machine comprises a first sexual stimulation unit; when the massage machine is at least partly inserted into the hollow cavity of the engine assembly, the first sexual stimulation unit is driven under a first driving force supplied from the engine assembly, to perform a first operation and apply a first sexual stimulation for a human body part, and the first sexual stimulation is a compression sexual stimulation generated along a radial direction for the human body part;

the massage machine further comprises a second sexual stimulation unit, when the massage machine is at least partly inserted into the hollow cavity of the engine assembly, the second sexual stimulation unit is driven under a second driving force supplied from the engine assembly, to perform a second operation and apply a second sexual stimulation for the human body part, and the second sexual stimulation is a rotation sexual stimulation generated along a circumferential direction for the human body part.

25. The massage machine as claimed in claim 24, wherein, the massage machine further comprises a third sexual stimulation unit, when the massage machine is at least partly inserted into the hollow cavity of the engine assembly, the third sexual stimulation unit is driven under a third driving force supplied from the engine assembly, to perform a third operation and apply a third sexual stimulation for the human body part, and the third sexual stimulation is a relative-displacement sexual stimulation generated along an axial direction for the human body part.

26. The massage machine as claimed in claim 25, wherein, the massage machine is configured for stimulating a penis or for stimulating a vagina.

* * * * *